US011972911B2

United States Patent
Choi et al.

(10) Patent No.: US 11,972,911 B2
(45) Date of Patent: Apr. 30, 2024

(54) ELECTRONIC DEVICE INCLUDING KEY ASSEMBLY

(71) Applicant: Samsung Electronics Co., Ltd., Suwon-si (KR)

(72) Inventors: Seungwhee Choi, Suwon-si (KR); Jingook Kim, Suwon-si (KR); Chijoon Kim, Suwon-si (KR); Wonyoung Seo, Suwon-si (KR); Seongki Jeong, Suwon-si (KR); Halim Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 17/370,574

(22) Filed: Jul. 8, 2021

(65) Prior Publication Data
US 2022/0013310 A1    Jan. 13, 2022

Related U.S. Application Data

(63) Continuation of application No. PCT/KR2021/007957, filed on Jun. 24, 2021.

(30) Foreign Application Priority Data

Jul. 9, 2020 (KR) .......................... 10-2020-0084683

(51) Int. Cl.
*H01H 13/14* (2006.01)
*H01H 13/04* (2006.01)

(52) U.S. Cl.
CPC ............ *H01H 13/14* (2013.01); *H01H 13/04* (2013.01)

(58) Field of Classification Search
CPC .. H01H 13/14; H01H 13/04; H01H 2221/026; H01H 2221/03; H01H 2221/08;
(Continued)

(56) References Cited

U.S. PATENT DOCUMENTS 8,542,482 B2 * 9/2013 Hsiung ................ H01H 13/705
200/341
8,946,573 B2    2/2015 Bae
(Continued)

FOREIGN PATENT DOCUMENTS

CN       101572195 A    11/2009
CN       103000435 A     3/2013
(Continued)

OTHER PUBLICATIONS

Sun Dan et al., Study on process scheme of thin-walled shell parts, Aug. 10, 2017.
(Continued)

*Primary Examiner* — Lheiren Mae A Caroc
(74) *Attorney, Agent, or Firm* — Jefferson IP Law, LLP

(57) ABSTRACT

An electronic device is provided. The electronic device includes a housing having a key hole formed therein and including a switch disposed therein, the key hole being formed such that a first length is longer than a second, perpendicular length and a key assembly coupled to the housing, a portion of the key assembly being disposed inside the key hole. The key assembly includes a cover member, a portion of which is exposed outside the housing through the key hole and a pressing member that is coupled to the cover member and presses the switch. The pressing member includes first protrusions protruding from opposite longitudinal ends of the pressing member in a first direction, and the first protrusions are brought into contact with an inner wall of the key hole and have elasticity such that a portion of the first protrusions are capable of elastic deformation.

20 Claims, 12 Drawing Sheets

(58) Field of Classification Search
CPC .............. H01H 2225/028; H01H 13/20; G06F 1/1616; G06F 1/1626; G06F 1/1671; H04M 1/236; H04M 1/0214; H05K 5/0217

See application file for complete search history.

(56) References Cited

U.S. PATENT DOCUMENTS

| | | | |
|---|---|---|---|
| 9,514,900 | B2 | 12/2016 | Park |
| 10,056,204 | B2 | 8/2018 | Lee et al. |
| 10,182,134 | B2 | 1/2019 | Lim et al. |
| 10,602,627 | B2 | 3/2020 | Lee et al. |
| 10,910,170 | B2 | 2/2021 | Choi et al. |
| 2012/0160640 | A1* | 6/2012 | Aldana .................. H01H 13/85 |
| | | | 200/341 |
| 2013/0056335 | A1 | 3/2013 | Bae |
| 2013/0213781 | A1 | 8/2013 | Lee et al. |
| 2014/0069790 | A1* | 3/2014 | Ely .................. H01H 11/00 |
| | | | 200/341 |
| 2015/0279589 | A1 | 10/2015 | Park |
| 2016/0233037 | A1 | 8/2016 | Lee et al. |
| 2017/0238431 | A1 | 8/2017 | Lee et al. |
| 2018/0183912 | A1 | 6/2018 | Lim et al. |
| 2018/0358190 | A1 | 12/2018 | Lee et al. |
| 2019/0080860 | A1 | 3/2019 | Choi et al. |
| 2019/0096610 | A1* | 3/2019 | Kanemaki .............. H01H 23/06 |
| 2021/0142962 | A1 | 5/2021 | Choi et al. |

FOREIGN PATENT DOCUMENTS

| | | |
|---|---|---|
| CN | 103258674 A | 8/2013 |
| CN | 103280357 A | 9/2013 |
| CN | 203327420 U | 12/2013 |
| CN | 204031240 U | 12/2014 |
| CN | 205069451 U | 3/2016 |
| CN | 106161702 A | 11/2016 |
| CN | 206908678 U | 1/2018 |
| CN | 206993218 U | 2/2018 |
| CN | 108140504 A | 6/2018 |
| CN | 207458807 U | 6/2018 |
| CN | 207731847 U | 8/2018 |
| JP | 2005-203114 A | 7/2005 |
| KR | 10-2010-0066333 A | 6/2010 |
| KR | 10-2017-0070602 A | 6/2017 |
| KR | 10-2020-0019412 A | 2/2020 |

OTHER PUBLICATIONS

Chinese Notice of Allowance dated Oct. 17, 2022, issued in Chinese Patent Application No. 202180002729.0.

International Search Report and Written Opinion dated Sep. 27, 2021, issued in International Patent Application No. PCT/KR2021/007957.

Extended European Search Report dated May 10, 2022, issued in European Patent Application No. 21735835.7-1224.

Chinese Office Action dated May 7, 2022, issued in Chinese Patent Application No. 202180002729.0.

Chinese Office Action dated Aug. 8, 2022, issued in Chinese Patent Application No. 202180002729.0.

* cited by examiner

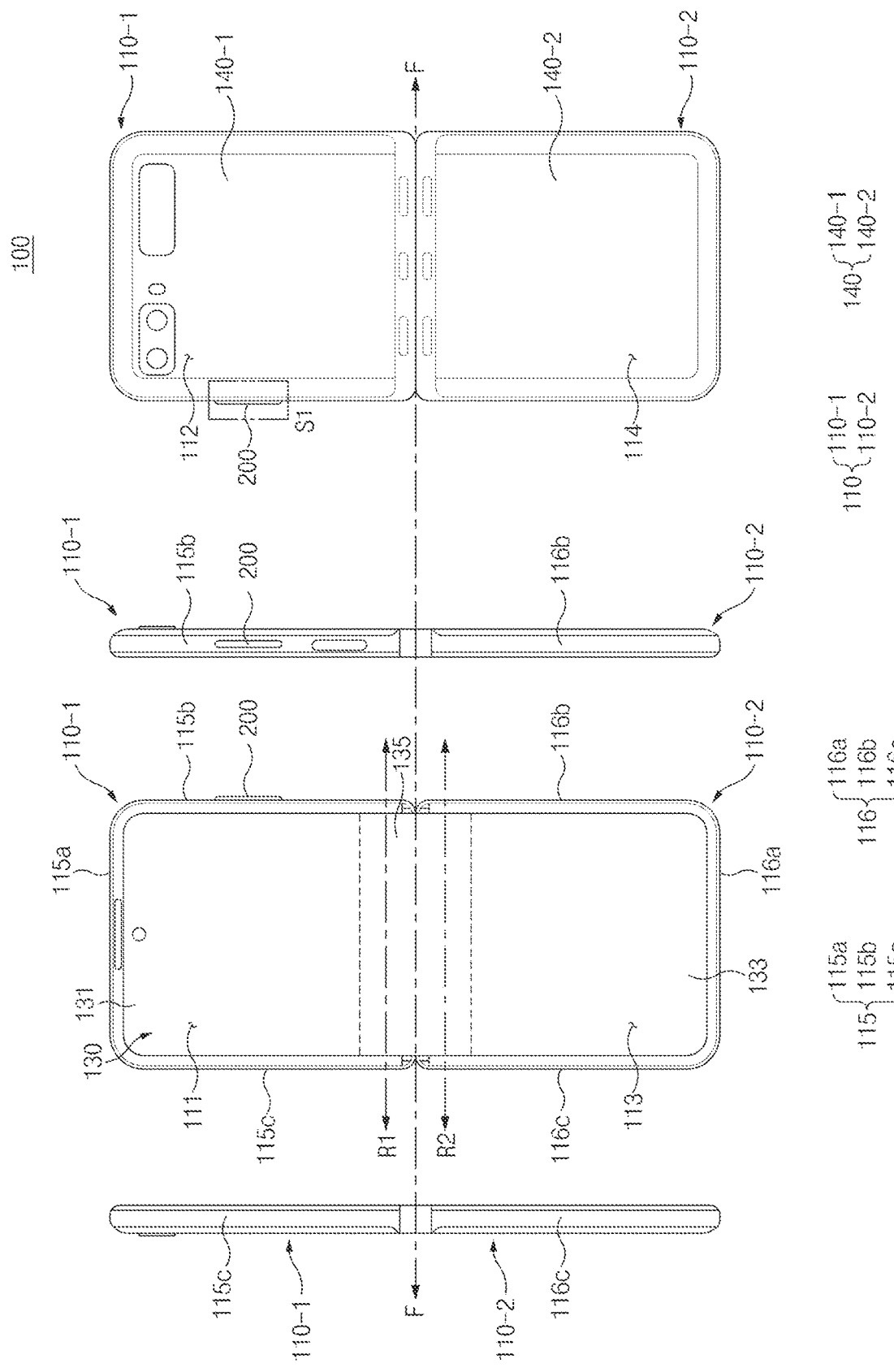

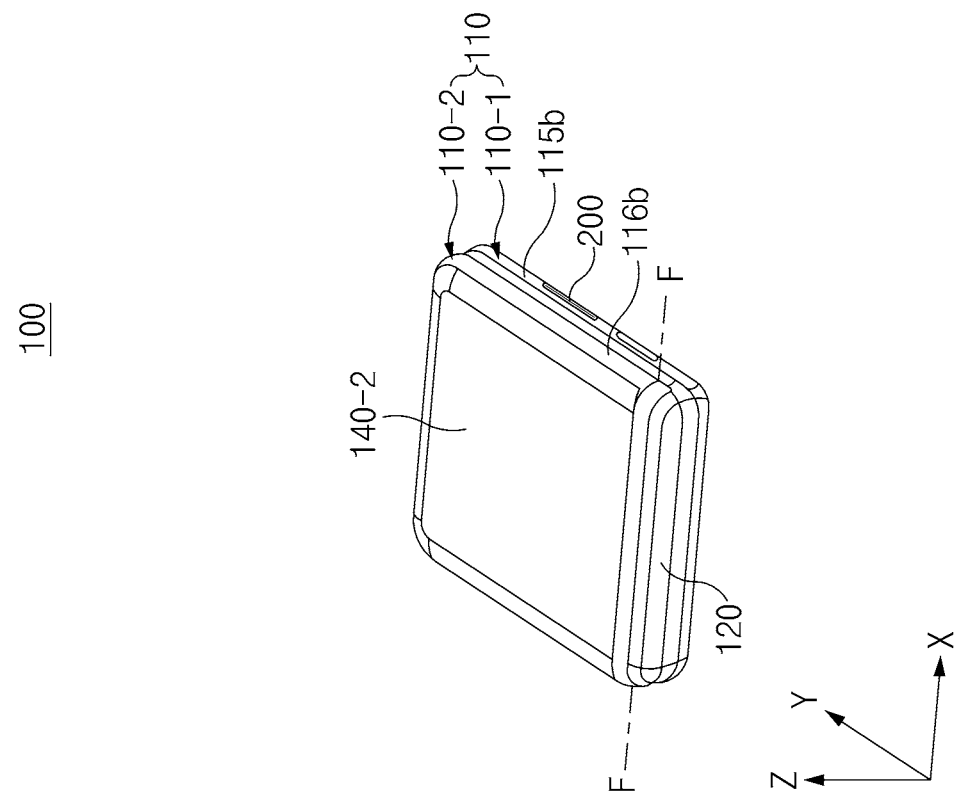
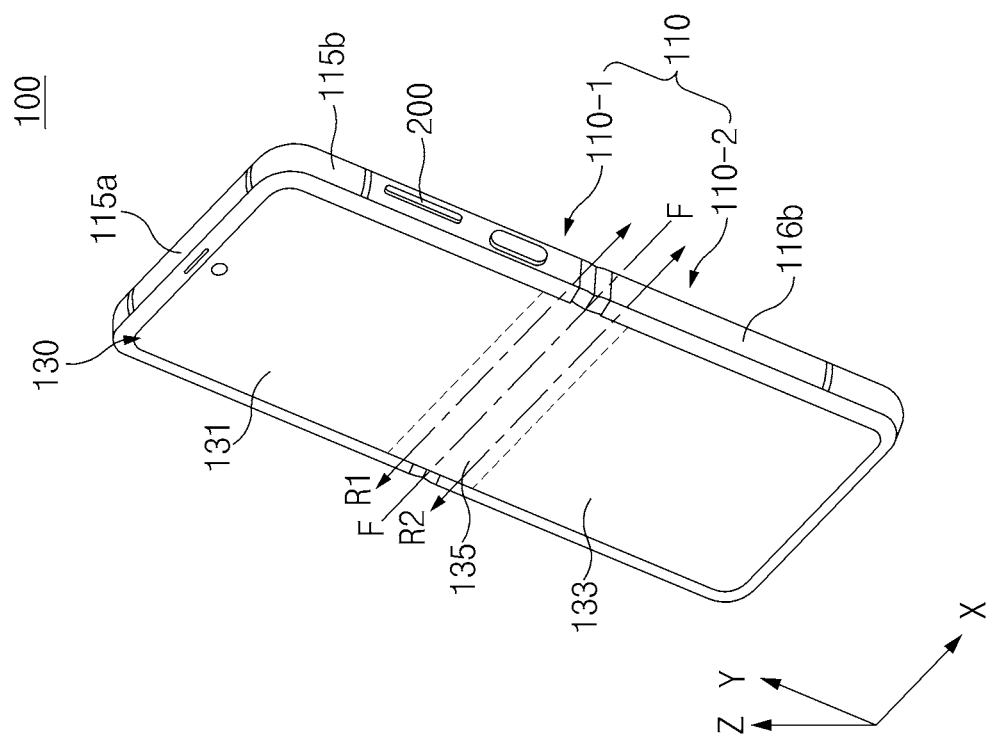
FIG. 2B
FIG. 2A

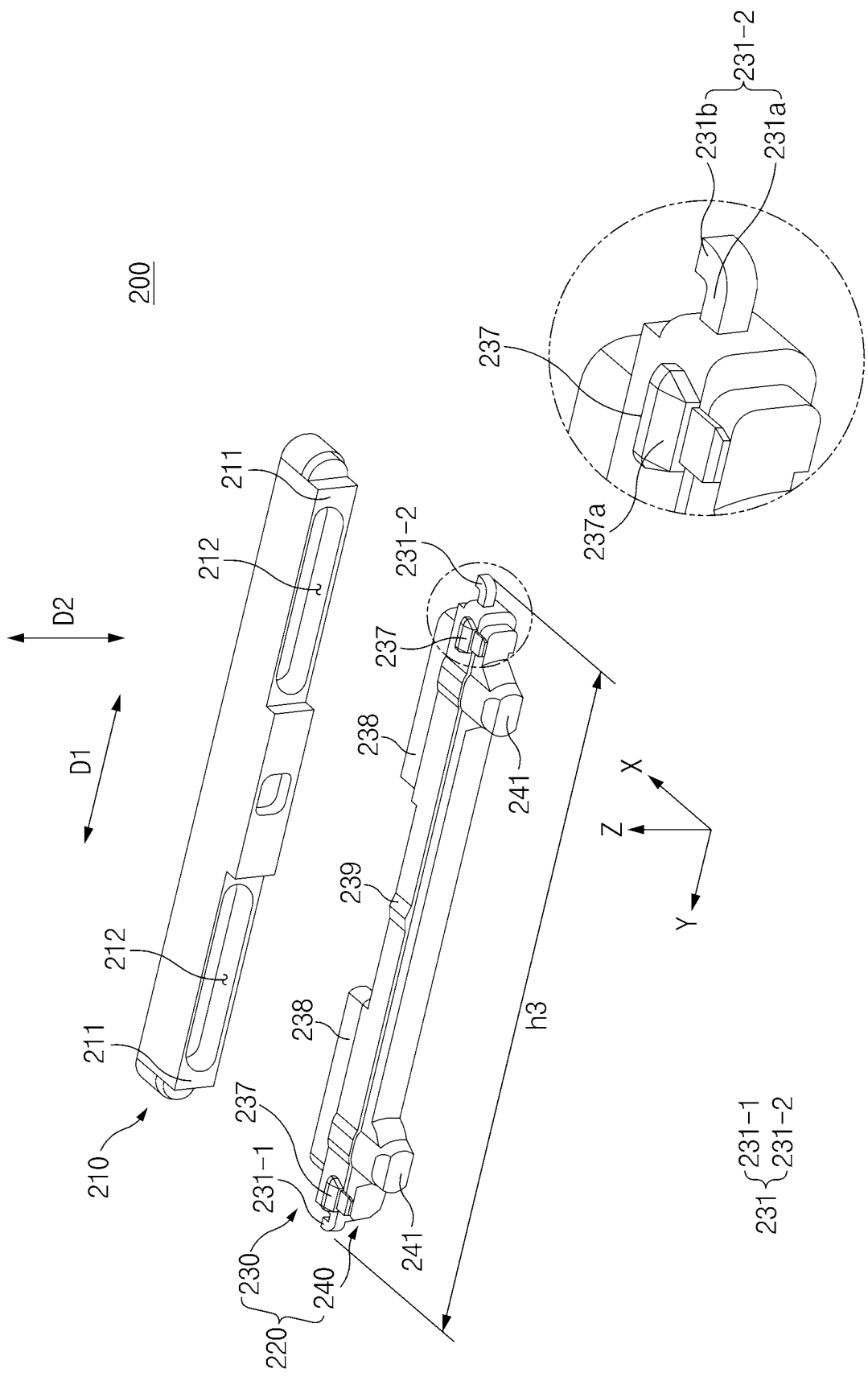

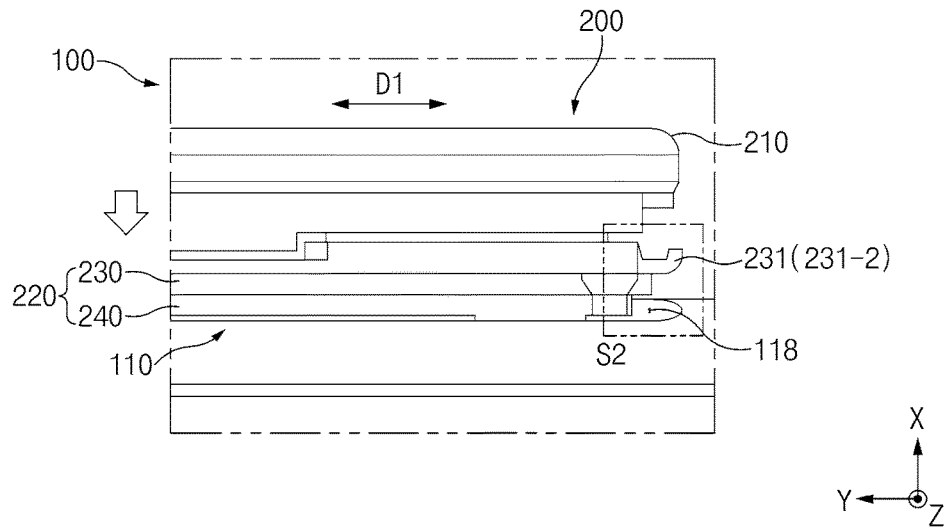
FIG.6A
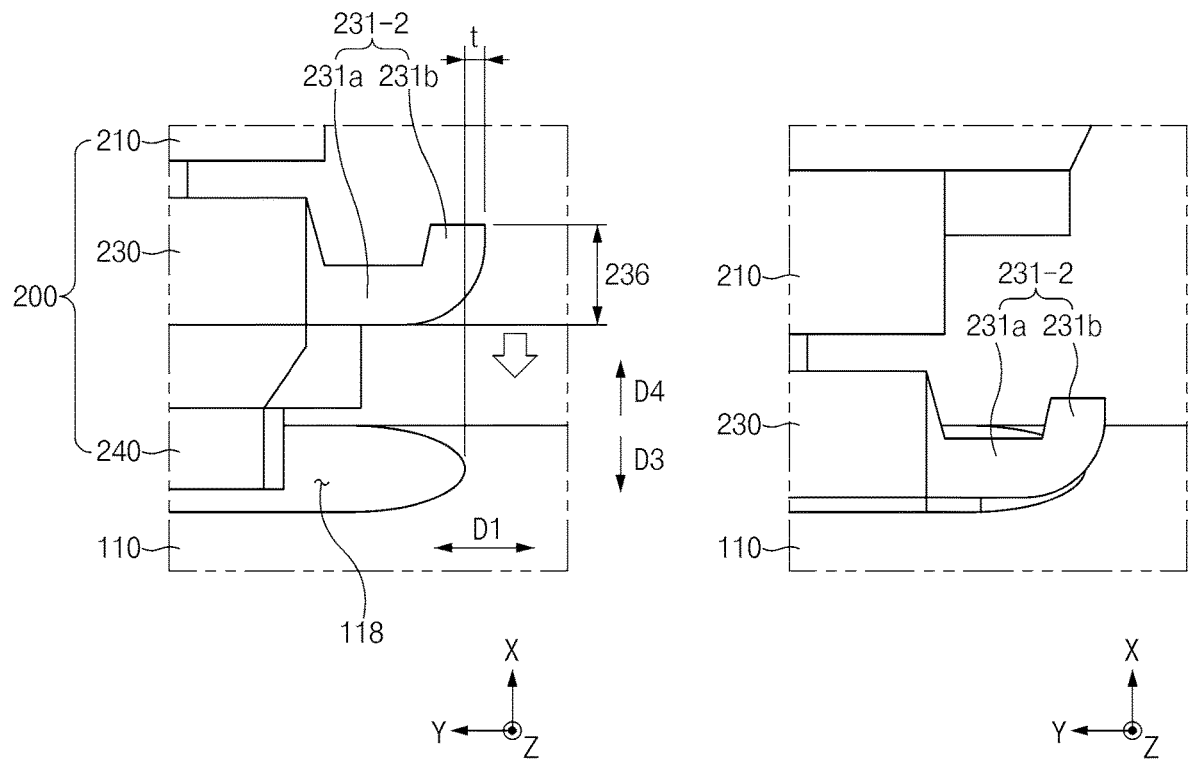
FIG.6B
FIG.6C

ELECTRONIC DEVICE INCLUDING KEY ASSEMBLY

CROSS-REFERENCE TO RELATED APPLICATION(S)

This application is a continuation application, claiming priority under § 365(c), of an International application No. PCT/KR2021/007957, filed on Jun. 24, 2021, which was based on and claimed the benefit of a Korean patent application number 10-2020-0084683, filed on Jul. 9, 2020, in the Korean Intellectual Property Office, the disclosure of which is incorporated by reference herein in its entirety.

TECHNICAL FIELD

The disclosure relates to an electronic device including a key assembly. More particularly, the disclosure relates to an electronic device including a structure for preventing a movement of a side key without deterioration in a feeling of clicking the side key.

BACKGROUND ART

An electronic device may include an input device including a button, a switch, or a key disposed in a housing of the electronic device for the purpose of turning power on/off or controlling a predetermined function. For example, a key assembly (e.g., a side key) may be installed on a side surface of the housing of the electronic device. The side key may be installed on the side surface of the housing and may operate in conjunction with a switch located inside the housing. When a user clicks the side key, the switch may be pressed by the side key, and a signal indicating that the switch is pressed may be input to a controller installed in the electronic device. Accordingly, a specific function of the electronic device may be controlled.

The above information is presented as background information only to assist with an understanding of the disclosure. No determination has been made, and no assertion is made, as to whether any of the above might be applicable as prior art with regard to the disclosure.

DISCLOSURE

Technical Problem

The key assembly (e.g., the side key) may be assembled to the housing by being inserted into a key hole formed in the side surface of the housing. The key assembly may be configured to press the switch while moving in the key hole depending on a click operation of the user. A fine gap for driving the key assembly may be formed between the key assembly and the key hole. For example, the length and width of the key hole may be formed to be greater than the length and width of the key assembly by predetermined numerical values. In this case, a phenomenon in which the key assembly is moved in the key hole due to the fine gap may occur.

Aspects of the disclosure are to address at least the above-mentioned problems and/or disadvantages and to provide at least the advantages described below. Accordingly, an aspect of the disclosure is to provide an electronic device including a structure for preventing a movement of a side key without deterioration in a feeling of clicking the side key.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing having a key hole formed therein and including a switch disposed therein, the key hole being formed such that a length extending in a first direction is longer than a length extending in a second direction perpendicular to the first direction, and a key assembly coupled to the housing, at least part of the key assembly being disposed inside the key hole. The key assembly includes a cover member, at least part of which is exposed outside the housing through the key hole and a pressing member that is coupled to the cover member and that presses the switch. The pressing member includes first protrusions protruding from opposite longitudinal end portions of the pressing member in the first direction, and the first protrusions are brought into contact with an inner wall of the key hole and have elasticity such that at least parts of the first protrusions are capable of elastic deformation.

In accordance with another aspect of the disclosure, an electronic device is provided. The electronic device includes a housing including a front surface, a rear surface that faces away from the front surface, and a side surface that surrounds an inner space between the front surface and the rear surface, the side surface including a key hole formed through the side surface in a direction toward the inner space from a partial area of the side surface, and a side key, at least part of which is inserted into the key hole, the side key being configured to move in the key hole by a first length by a click operation. The side key includes a cover member exposed on the side surface through the key hole and a pressing member that is coupled to the cover member and that presses a dome switch disposed in the inner space. The pressing member includes a first member formed of an elastic material and a second member that is coupled to the first member and that presses the dome switch depending on a movement of the side key. The first member includes first protrusions protruding from opposite end portions of the first member in a length direction of the side key, and the first protrusions are brought into contact with an inner wall of the key hole.

Advantageous Effects

In the electronic devices according to the various embodiments of the disclosure, the protrusions (e.g., movement prevention protrusions) having elasticity may be brought into contact with the inner wall of the key hole so as to overlap the inner wall of the key hole in the state in which the key assembly is assembled to the housing, thereby preventing a movement of the key assembly.

Furthermore, in the electronic devices according to the various embodiments of the disclosure, the degree of overlap between the movement prevention protrusions and the inner wall of the key hole may be adjusted depending on the shapes of the movement prevention protrusions. Accordingly, a movement of the key assembly may be improved without deterioration in a feeling of clicking the key assembly.

In addition, in the electronic devices according to the various embodiments of the disclosure, at least parts of the movement prevention protrusions may extend in the opposite direction to the click direction and/or the assembly direction of the key assembly. Accordingly, a phenomenon in which the movement prevention protrusions are stopped by the key hole when the key assembly is assembled or the movement prevention protrusions are turned inside out when the key assembly is clicked may be prevented.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 1A, 1B, 1C, and 1D are views illustrating a front surface, a rear surface, and side surfaces of an electronic device according to embodiments of the disclosure;

FIG. 2A is a view illustrating an unfolded state and a folded state of an electronic device according to an embodiment of the disclosure;

FIG. 2B is a view illustrating an unfolded state and a folded state of an electronic device according to an embodiment of the disclosure.

FIGS. 5A and 5B are exploded perspective view of a key assembly of an electronic device according to embodiments of the disclosure;

FIG. 6A illustrates an operation in which a key assembly is coupled to a housing in an electronic device according to an embodiment of the disclosure;

FIG. 6B illustrates an operation in which a key assembly is coupled to a housing in an electronic device according to an embodiment of the disclosure;

FIG. 6C illustrates an operation in which a key assembly is coupled to a housing in an electronic device according to an embodiment of the disclosure;

Throughout the drawings, like reference numerals will be understood to refer to like parts, components, and structures.

MODE FOR DISCLOSURE

Figure 3:
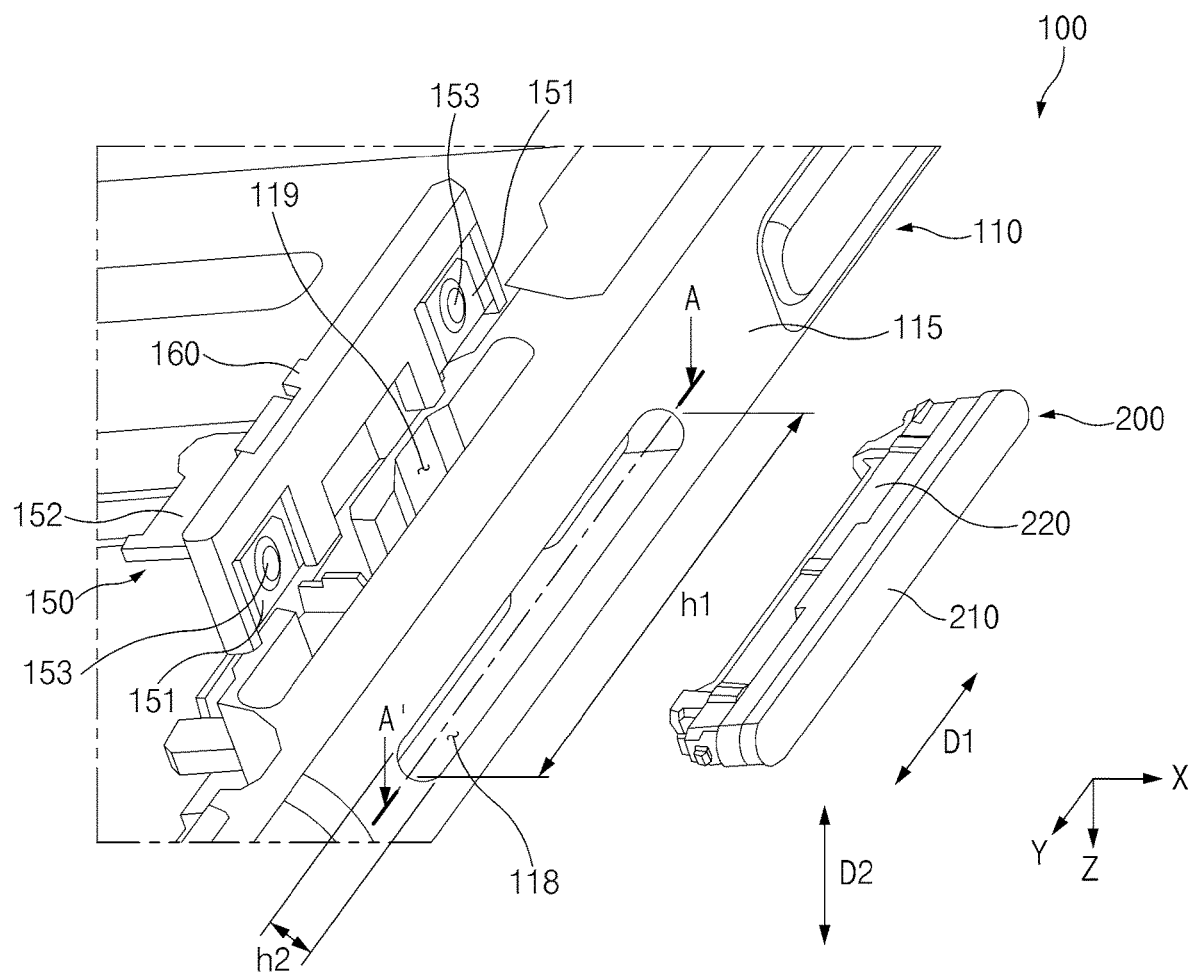
FIG. 3 is a view illustrating a state in which a key assembly and a key bracket of an electronic device are separated from a housing according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1A, 1B, 1C, and 1D are views illustrating a front surface, a rear surface, and side surfaces in an unfolded state of an electronic device according to embodiments of the disclosure.

FIG. 2A is a view illustrating an unfolded state and a folded state of an electronic device according to an embodiment of the disclosure.

FIG. 2B is a view illustrating an unfolded state and a folded state of an electronic device according to an embodiment of the disclosure.

Referring to FIGS. 1A, 1B, 1C, 1D, 2A, and 2B, an electronic device 100 according to an embodiment may include a housing 110, a flexible display 130, a back cover 140, and a key assembly 200.

According to an embodiment, the electronic device 100 may be a foldable electronic device (e.g., a flexible display device) that is able to be changed to an unfolded state (e.g., FIGS. 1 and 2A) and a folded state (e.g., FIG. 2B). The electronic device 100 may include an unfolded state in which the flexible display 130 is formed to be a substantially flat surface and a folded state in which a partial area of the flexible display 130 is formed to be a curved surface.

In an embodiment, the housing 110 may be a foldable housing and may include a first housing 110-1 and a second housing 110-2.

In an embodiment, the first housing 110-1 and the second housing 110-2 may be folded or unfolded about a virtual folding axis F relative to each other. The first housing 110-1 and the second housing 110-2 may be coupled so as to be rotatable about virtual axes of rotation (a first axis of rotation R1 and a second axis of rotation R2) that are formed over the flexible display 130 and are parallel to the folding axis F. In an embodiment, the virtual axes of rotation R1 and R2 may be formed by a hinge structure (not illustrated) and may include the first axis of rotation R1 and the second axis of rotation R2 parallel to the first axis of rotation R1. For example, the first housing 110-1 is rotatable about the first axis of rotation R1 relative to the second housing 110-2, and the second housing 110-2 is rotatable about the second axis of rotation R2 relative to the first housing 110-1. The first housing 110-1 and the second housing 110-2 may be folded or unfolded about the folding axis F by rotating about the first axis of rotation R1 and the second axis of rotation R2.

In an embodiment, the first housing 110-1 and the second housing 110-2 may be disposed on opposite sides of the folding axis F and may have substantially symmetric shapes with respect to the folding axis F. The angle or distance between the first housing 110-1 and the second housing 110-2 may vary depending on whether the electronic device 100 is in an unfolded state (or, an opened state), a folded state (or, a closed state), or an intermediate state. In another embodiment, the first housing 110-1 and the second housing 110-2 may have asymmetric shapes with respect to the folding axis F. For example, when the electronic device 100 is in a folded state, the first housing 110-1 and the second housing 110-2 may be folded in an asymmetric form about the folding axis F such that part of the flexible display 130 is exposed outside the electronic device 100.

Although not illustrated, the first housing 110-1 and the second housing 110-2 may be connected through the hinge structure (not illustrated). For example, the hinge structure (not illustrated) may connect the first housing 110-1 and the second housing 110-2 such that the first housing 110-1 and the second housing 110-2 are folded, with the folding axis F therebetween. The hinge structure (not illustrated) may be coupled or connected to a partial area of the first housing 110-1 and a partial area of the second housing 110-2 to form the first axis of rotation R1 and the second axis of rotation R2. In an embodiment, at least part of the hinge structure (not illustrated) may be disposed inside a hinge housing 120. Depending on an operational state (an unfolded state or a folded state) of the electronic device 100, the hinge housing 120 may be hidden by part of the first housing 110-1 and part of the second housing 110-2, or may be exposed outside the housing 110.

In an embodiment, the first housing 110-1 may include a first surface 111 disposed to face toward the front surface of the electronic device 100 in an unfolded state of the electronic device 100, a second surface 112 facing away from the first surface 111, and a first side member 115 surrounding at least part of a space between the first surface 111 and the second surface 112. The first surface 111 may overlap at least part (e.g., a first flat area 131 or a folding area 135) of the flexible display 130, and the second surface 112 may overlap at least part (e.g., a first back cover 140-1) of the back cover 140. The first side member 115 may include a first side surface 115a disposed parallel to the folding axis F, a second side surface 115b extending from one end of the first side surface 115a in a direction perpendicular to the folding axis F, and a third side surface 115c extending from an opposite end of the first side surface 115a in the direction perpendicular to the folding axis F.

In an embodiment, the second housing 110-2 may include a third surface 113 disposed to face toward the front surface of the electronic device 100 in an unfolded state of the electronic device 100, a fourth surface 114 facing away from the third surface 113, and a second side member 116 surrounding at least part of a space between the third surface 113 and the fourth surface 114. The third surface 113 may overlap at least part (e.g., a second flat area 133 or the folding area 135) of the flexible display 130, and the fourth surface 114 may overlap at least part (e.g., a second back cover 140-2) of the back cover 140. The second side member 116 may include a fourth side surface 116a disposed parallel to the folding axis F, a fifth side surface 116b extending from one end of the fourth side surface 116a in a direction perpendicular to the folding axis F, and a sixth side surface 116c extending from an opposite end of the fourth side surface 116a in the direction perpendicular to the folding axis F.

In an embodiment, the first surface 111 of the first housing 110-1 and the third surface 113 of the second housing 110-2 may face each other in a folded state of the electronic device 100 and may be located to face the same direction in an unfolded state of the electronic device 100.

In an embodiment, at least part of the first housing 110-1 and at least part of the second housing 110-2 may be formed of a metallic material, or may be formed of a non-metallic material. At least part of the first housing 110-1 and at least part of the second housing 110-2 may be formed of a metallic or non-metallic material having a specified stiffness to support the flexible display 130.

In an embodiment, the flexible display 130 may form one surface of the first housing 110-1 and one surface of the second housing 110-2.

In an embodiment, the flexible display 130 may include the first flat area 131 and the second flat area 133 formed to be substantially flat surfaces and the folding area 135 that is able to be deformed to be a flat surface or a curved surface. The flexible display 130 may refer to a flexible or foldable display, at least a partial area of which is able to be deformed to be a flat surface or a curved surface.

In an embodiment, the first flat area 131 may be disposed on at least a partial area of the first housing 110-1. For example, the first flat area 131 may be attached to and located on at least part of the first housing 110-1 to form at least part of the front surface of the electronic device 100 (e.g., at least part of the first surface 111 of the first housing 110-1) and may remain flat when the electronic device 100 is folded or unfolded.

In an embodiment, the second flat area 133 may be disposed on at least a partial area of the second housing 110-2. For example, the second flat area 133 may be attached to and located on at least part of the second housing 110-2 to form at least part of the front surface of the electronic device 100 (e.g., at least part of the third surface 113 of the second housing 110-2) and may remain flat when the electronic device 100 is folded or unfolded.

In an embodiment, the folding area 135 may be formed between the first flat area 131 and the second flat area 133 and may be disposed such that at least part of the folding area 135 overlaps the hinge structure (not illustrated). The folding area 135 may be formed to be a curved surface in a folded state and may be formed to be a flat surface in an unfolded state.

The above-described division of the flexible display 130 into the areas merely corresponds to physical division by the first housing 110-1, the second housing 110-2, and the hinge structure (not illustrated), and the flexible display 130 may be configured such that an entire screen is displayed by using the first housing 110-1, the second housing 110-2, and the hinge structure (not illustrated).

In an embodiment, the back cover 140 may include the first back cover 140-1 and the second back cover 140-2.

In an embodiment, the first back cover 140-1 may be coupled to at least part of the first housing 110-1 and may form at least part of the rear surface of the electronic device 100 (e.g., at least part of the second surface 112 of the first housing 110-1). The first back cover 140-1 may have a substantially quadrilateral periphery. At least part of the periphery may be surrounded by the first housing 110-1. The second back cover 140-2 may be coupled to at least part of the second housing 110-2 and may form at least part of the rear surface of the electronic device 100 (e.g., at least part of the fourth surface 114 of the second housing 110-2), and at least part of a periphery of the second back cover 140-2 may be surrounded by the second housing 110-2.

According to the illustrated embodiment, the first back cover 140-1 and the second back cover 140-2 may have substantially symmetric shapes with respect to the folding axis F. However, without being limited to the illustrated embodiment, the first back cover 140-1 and the second back cover 140-2 may be formed in various shapes. Furthermore, according to various embodiments of the disclosure, the first back cover 140-1 may be integrally formed with the first housing 110-1, and the second back cover 140-2 may be integrally formed with the second housing 110-2.

In an embodiment, the first housing 110-1, the second housing 110-2, the first back cover 140-1, and the second back cover 140-2 may provide, through a mutually coupled structure, a space in which various components (e.g., a printed circuit board, an antenna module, a sensor module, or a battery) of the electronic device 100 are disposed.

In an embodiment, the key assembly 200 (e.g., an input module 350 of FIG. 12) may be disposed on the side members 115 and 116 of the housing 110. The key assembly 200 may include side keys disposed on the side members 115 and 116 of the housing 110. For example, the key assembly 200 may be disposed on part (e.g., the second side surface 115b) of the first side member 115 of the first housing 110-1. However, the position of the key assembly 200 is not limited to the illustrated embodiment, and according to various embodiments of the disclosure, the key assembly 200 may be alternatively or additionally disposed in a different position. For example, the key assembly 200 may be disposed on the first side surface 115a or the third side surface 115c instead of the second side surface 115b of the first side member 115, or may be disposed on part (e.g., one of the fourth side surface 116a, the fifth side surface 116b, and the sixth side surface 116c) of the second housing 110-2. In another example, the electronic device 100 may further include another key assembly (not illustrated) that is disposed on the first side surface 115a and/or the third side surface 115c, in addition to the key assembly 200 disposed on the second side surface 115b. Furthermore, the additionally disposed key assembly (not illustrated) may be disposed on some side surfaces (e.g., at least one of the fourth side surface 116a, the fifth side surface 116b, and the sixth side surface 116c) of the second side member 116 of the second housing 110-2.

In an embodiment, the electronic device 100 may perform a function of turning on/off a screen of the flexible display 130 in response to an input of the key assembly 200. Alternatively, the electronic device 100 may perform a function of adjusting voice call volume or multimedia file playback volume in response to an input of the key assembly 200. For example, the key assembly 200 may include a volume key or a power key. According to various embodiments of the disclosure, the key assembly 200 may be configured to receive and/or obtain biometric information (e.g., a fingerprint) of a user. For example, the key assembly 200 may be implemented with a fingerprint sensing button capable of sensing a fingerprint. The key assembly 200 may include a fingerprint sensor module (not illustrated) and may be configured such that a fingerprint of the user is sensed by the fingerprint sensor module when a body (e.g., a finger) of the user is brought into contact with the key assembly 200.

Hereinafter, operations of the first housing 110-1 and the second housing 110-2 and states of the areas of the flexible display 130 depending on operational states (e.g., an unfolded state and a folded state) of the electronic device 100 will be described.

In an embodiment, when the electronic device 100 is in an unfolded state (e.g., FIG. 2A), the first housing 110-1 and the second housing 110-2 may form the same plane while forming an angle of substantially 180 degrees. The first flat area 131 and the second flat area 133 of the flexible display 130 may be located to face the same direction. The folding area 135 of the flexible display 130 may form the same plane together with the first flat area 131 and the second flat area 133. In the unfolded state, the first flat area 131, the second flat area 133, and the folding area 135 may form a screen display area while being exposed on the front surface of the electronic device 100.

In an embodiment, when the electronic device 100 is in a folded state (e.g., FIG. 2B), the first housing 110-1 and the second housing 110-2 may be located to face each other. The first flat area 131 and the second flat area 133 of the flexible display 130 may face each other while forming a narrow angle (e.g., between 0 degrees and 10 degrees). At least part of the folding area 135 may be formed to be a curved surface having a predetermined curvature.

In an embodiment, when the electronic device 100 is in an intermediate state (not illustrated), the first housing 110-1 and the second housing 110-2 may be disposed at a certain angle. The intermediate state may refer to a state between the unfolded state and the folded state of the electronic device 100. For example, the intermediate state may refer to a state before the first housing 110-1 and the second housing 110-2 are fully unfolded or a state before the first housing 110-1 and the second housing 110-2 are fully folded. The angle between the first flat area 131 and the second flat area 133 of the flexible display 130 in the intermediate state may be greater than the angle in the folded state and may be smaller than the angle in the unfolded state. At least part of the folding area 135 may be formed to be a curved surface having a predetermined curvature, and the curvature may be smaller than the curvature in the folded state and may be greater than the curvature in the unfolded state.

The electronic device 100 according to the illustrated embodiment may be a foldable electronic device 100. However, electronic devices according to various embodiments of the disclosure are not limited to the electronic device 100 illustrated in FIGS. 1, 2A, and 2B and may include various types of electronic devices including the key assembly 200. For example, the electronic devices may include a bar type electronic device (not illustrated) and a slidable (or, rollable) electronic device (not illustrated).

FIG. 3 is a view illustrating a state in which a key assembly and a key bracket of an electronic device are separated from the housing according to an embodiment of the disclosure.

Figure 4:
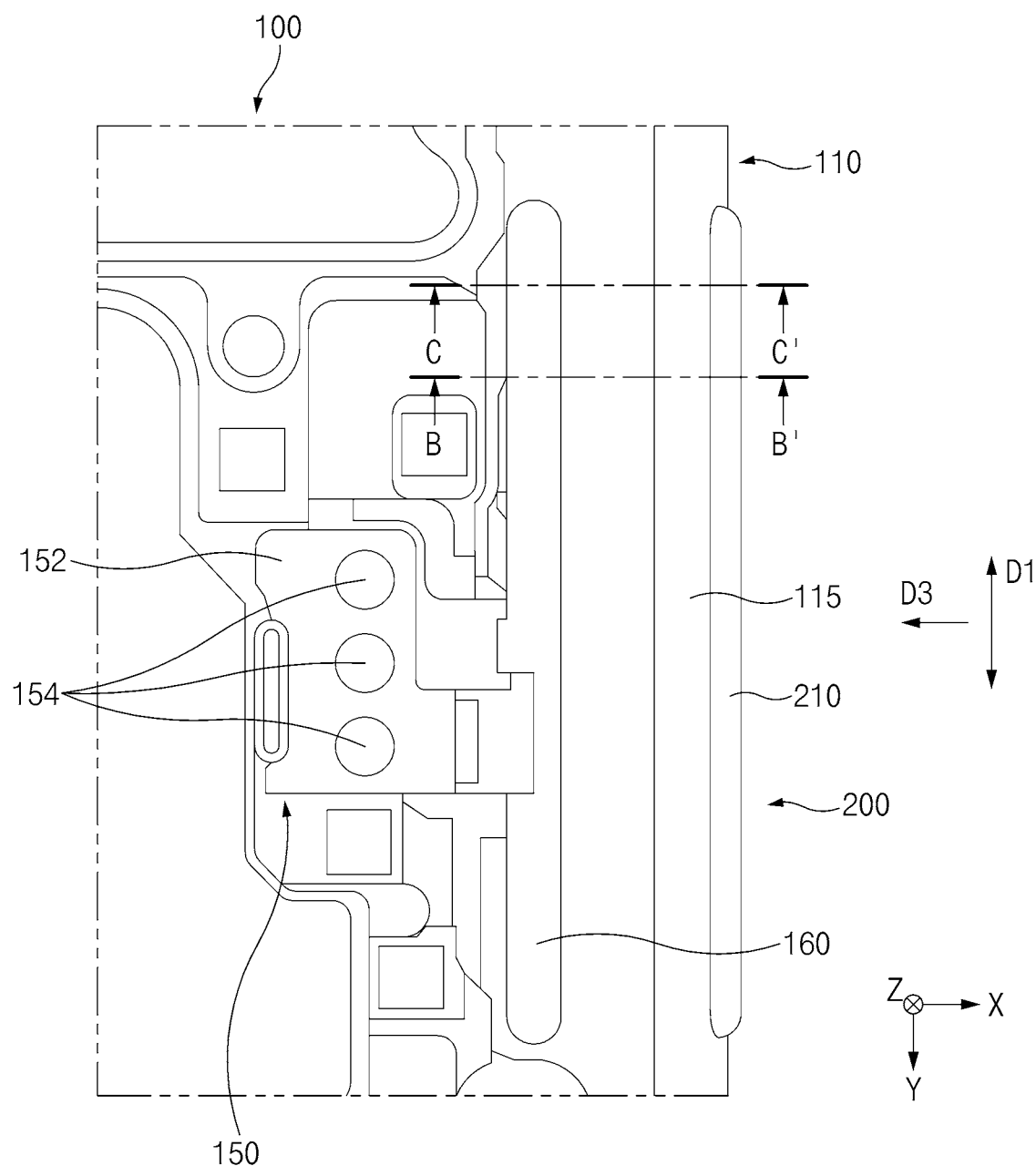
FIG. 4 is a view illustrating a state in which a key assembly and a key bracket of an electronic device are coupled to a housing according to an embodiment of the disclosure.

FIG. 4 is a view illustrating a state in which a key assembly and a key bracket of an electronic device are coupled to a housing according to an embodiment of the disclosure.

FIG. 3 is a perspective view when an electronic device is viewed from the rear. FIG. 4 is a plan view when an electronic device is viewed from the rear. FIG. 4 is an enlarged view of portion 51 in FIGS. 1A, 1B, 1C, and 1D. For example, FIGS. 3 and 4 are views from which the back cover is omitted to represent states before and after the key assembly and the key bracket are coupled to the housing.

Referring to FIGS. 3 and 4, an electronic device 100 according to an embodiment may include a housing 110, a key circuit board 150, a key bracket 160, and a key assembly 200.

In an embodiment, the housing 110 may include a key hole 118 in which the key assembly 200 is disposed and a bracket recess 119 in which the key bracket 160 and the key circuit board 150 are disposed.

In an embodiment, the key hole 118 may be formed in a sidewall of the housing 110 such that at least part of the key assembly 200 is disposed in an inner space of the key hole 118. One or more key holes 118 may be formed in at least part (e.g., the first side member 115 of FIGS. 1 to 2B) of the housing 110. For example, the key hole 118 may be formed in at least a partial area of the first side member 115 of the housing 110. The key hole 118 may be formed through a partial area of the first side member 115 in a lateral direction (e.g., the +X/−X-axis direction). For example, the key hole 118 may be formed through an inside wall (e.g., a portion facing toward the inside of the housing 110) and an outside wall (e.g., a portion facing toward the outside of the housing 110) of the first side member 115 in the lateral direction. At least part of the key assembly 200 may be inserted into the key hole 118 in the lateral direction (e.g., the +X/−X-axis direction).

In the illustrated embodiment, the key hole 118 may be formed in a partial area (e.g., the second side surface 115b of FIGS. 1 to 2B) of the first side member 115 of the housing 110. However, this is illustrative, and the position of the key hole 118 is not limited to the illustrated embodiment. According to various embodiments of the disclosure, the key hole 118 may be alternatively or additionally formed in another side member (e.g., the second side member 116) of the housing 110 to correspond to the position where the key assembly 200 is disposed in the housing 110.

In an embodiment, the key hole 118 may have a shape and/or a size substantially corresponding to part of the key assembly 200 such that at least part of the key assembly 200 is inserted into the key hole 118. The key hole 118 may be formed such that a length h1 extending in a first direction D1 is longer than a length h2 extending in a second direction D2. The first direction D1 may refer to the length direction of the key hole 118 and/or the key assembly 200 and may be construed to be a direction parallel to the −Y/+Y-axis direction. The second direction D2 may refer to the width direction of the key hole 118 and/or the key assembly 200 and may be construed to be a direction parallel to the −Z/+Z-axis direction. For example, the key hole 118 may be formed in an oval shape having a major axis facing the first direction D1 and a minor axis facing the second direction D2. In another example, the key hole 118 may be formed in a rectangular shape extending in the first direction D1 and having rounded corners. However, the shape of the key hole 118 is not limited to the illustrated embodiment and may be modified according to various embodiments of the disclosure.

In an embodiment, the key bracket 160 and at least part of the key circuit board 150 may be accommodated in the bracket recess 119. The bracket recess 119 may provide a space in which the key bracket 160 is mounted, such that the key bracket 160 and the key circuit board 150 are fixed inside the housing 110.

In an embodiment, the bracket recess 119 may be formed in at least a partial area of the housing 110 so as to be located adjacent to the key hole 118. A partial area of the first side member 115 may be recessed in a direction (e.g., the +Z-axis direction) toward the front surface of the electronic device 100 to form the bracket recess 119. For example, the bracket recess 119 may be recessed in a direction substantially perpendicular to the direction (e.g., the +X/−X-axis direction) in which the key hole 118 penetrates. When the key bracket 160 is disposed in the bracket recess 119 and the key assembly 200 is disposed in the key hole 118, the key bracket 160 and the key assembly 200 may be substantially perpendicular to each other.

In an embodiment, the bracket recess 119 may be at least partially connected with the key hole 118. For example, the bracket recess 119 and the key hole 118 may be connected with each other. When the key assembly 200 is pressed in the state in which the key bracket 160 is mounted in the bracket recess 119 and the key assembly 200 is inserted into the key hole 118, at least part of the key assembly 200 may make contact with at least part of the key circuit board 150.

In an embodiment, the key circuit board 150 may transfer an electrical signal to control circuitry (e.g., a processor 320 of FIG. 12) of the electronic device 100 as at least part of the key circuit board 150 is brought into contact with and separated from the key assembly 200 in response to a press of the key assembly 200. For example, the key circuit board 150 may include switches 153 brought into contact with the key assembly 200 and contact terminals 154 electrically connected with the control circuitry (e.g., the processor 320 of FIG. 12).

In an embodiment, the key circuit board 150 may include a first circuit board portion 151 that is at least partially mounted in an inner space of the key bracket 160 and that faces the key assembly 200, and a second circuit board portion 152 that extends from the first circuit board portion 151 into an inner space of the housing 110 and that is electrically connected with the control circuitry (not illustrated). For example, the key circuit board 150 may include a printed circuit board (PCB) or a flexible printed circuit board (FPCB).

In an embodiment, the switches 153 may be provided on partial areas of the first circuit board portion 151 to face parts (e.g., pressing protrusions 241 of FIGS. 5A and 5B) of the key assembly 200. The switches 153 may be pressed by the parts (e.g., the pressing protrusions 241) of the key assembly 200 and may generate electrical signals for an input operation of the key assembly 200. The switches 153 may contain an elastic material and may be elastically deformed in a predetermined shape as the switches 153 are pressed by the key assembly 200 or released. For example, the switches 153 may include dome switches, and the dome switches may be mounted on one surface of the first circuit board portion 151 by surface mounting technology (SMT).

In an embodiment, the contact terminals 154 may be provided on a partial area of the second circuit board portion 152. The contact terminals 154 may transfer electrical signals generated by pressing the switches 153 to a main circuit board (not illustrated) and/or the control circuitry (e.g., the processor 320 of FIG. 12). For example, the contact terminals 154 may include a plurality of conductive areas formed on one surface of the second circuit board portion 152. The contact terminals 154 may be electrically connected with the main circuit board (not illustrated), which is disposed inside the housing 110, through a connecting member (not illustrated) (e.g., a C-clip or a pogo pin).

In an embodiment, the key assembly 200 may transfer various user inputs to the electronic device 100 (e.g., the processor 320 of FIG. 12) as a user presses the key assembly 200. However, a method of transferring, by the key assembly 200, an electrical signal (e.g., a user input) is not limited to a case in which pressure is physically applied by a push operation. According to various embodiments of the disclosure, the key assembly 200 may include a fingerprint sensor module (not illustrated). In such a case, the key assembly 200 may be configured to transfer an electrical signal (e.g., a user input signal) by only an operation of touching at least part of the key assembly 200 even though the user does not apply pressure for a physical movement of the key assembly 200.

In an embodiment, the key assembly 200 may be coupled to one side of the housing 110 such that at least part of the key assembly 200 is exposed outside the housing 110. The key assembly 200 may be inserted into the key hole 118 in the lateral direction (e.g., the +X/−X-axis direction). For example, the key assembly 200 may be disposed in a partial area of the first side member 115, and thus the user may easily click (or, touch) the key assembly 200 in a state gripping the electronic device 100.

In an embodiment, the key assembly 200 may be configured to move in the lateral direction (e.g., the +X/−X-axis direction) inside the key hole 118 as the user presses or releases the key assembly 200. For example, when the user presses the key assembly 200 in a third direction D3 (e.g., the −X-axis direction), the key assembly 200 may move in the third direction D3 inside the key hole 118 by a specified distance (e.g., a first distance L1 of FIGS. 8 and 9). Thereafter, when the user releases the pressure against the key assembly 200, the key assembly 200 may move in a direction (e.g., the +X-axis direction) opposite to the third direction D3 inside the key hole 118 and may return to the position before the key assembly 200 is pressed by the user. For example, the third direction D3 may be defined as a direction that is substantially perpendicular to the first direction D1 and/or the second direction D2 and that faces toward the inside of the housing 110 from outside the housing 110.

In an embodiment, the key assembly 200 may include a cover member 210 and a pressing member 220. For example, at least part of the cover member 210 may be exposed outside the first side member 115 through the key hole 118. At least part of the cover member 210 may protrude from the first side member 115 in the lateral direction (e.g., the +X/−X-axis direction). The cover member 210 may receive an external force from the user and may be moved into the key hole 118 by the external force. The pressing member 220 may be coupled to one side of the cover member 210 so as to be disposed inside the key hole 118. The pressing member 220, together with the cover member 210, may move in the key hole 118 as an external force is applied to the cover member 210. The pressing member 220 may press the switches 153 while being moved by the external force applied to the cover member 210.

FIGS. 5A and 5B are exploded perspective views of a key assembly of an electronic device according to embodiments of the disclosure.

Referring to FIGS. 5A and 5B, a key assembly 200 according to an embodiment may include a cover member 210 and a pressing member 220. According to the embodiments illustrated in FIGS. 5A and 5B, the key assembly 200 may include the cover member 210 and the pressing member 220 that are configured to be coupled with each other. However, this is illustrative, and according to various embodiments of the disclosure, the cover member 210 and the pressing member 220 may be integrated with each other.

In an embodiment, when the key assembly 200 is coupled to a housing (e.g., the housing 110 of FIGS. 1 to 4), at least part of the cover member 210 may be exposed outside the housing 110. For example, the cover member 210 may be formed of substantially the same material as the housing 110. The cover member 210 may contain an aluminum (Al) material.

In an embodiment, the cover member 210 may be coupled with the pressing member 220. For example, the cover member 210 may be bonded with at least part of the pressing member 220. The cover member 210 may include receiving recesses 212 for a coupling with the pressing member 220.

In an embodiment, the receiving recesses 212 may be formed in one surface (e.g., an inside surface 211) of the cover member 210 to face the pressing member 220. For example, the cover member 210 may include the inside surface 211 (e.g., a surface facing the −X-axis direction) that faces the pressing member 220, and the receiving recesses 212 may be concavely formed in at least a partial area of the inside surface 211. Here, the inside surface 211 of the cover member 210 may be defined as a surface facing away from an outside surface (e.g., a surface facing the +X-axis direction) of the cover member 210 that is exposed outside the housing 110. Partial areas of the inside surface 211 may be recessed toward the outside surface (e.g., in the +X-axis direction) to form the receiving recesses 212. At least parts (e.g., third protrusions 238) of the pressing member 220 may be inserted into the receiving recesses 212. For example, the receiving recesses 212 may be formed in shapes corresponding to the third protrusions 238 such that the third protrusions 238 of the pressing member 220 are inserted into the receiving recesses 212. The receiving recesses 212 and the third protrusions 238 may be bonded with each other through an adhesive member.

In an embodiment, the pressing member 220 may be coupled to the cover member 210. The pressing member 220 may include a first member 230 coupled to the cover member 210 and a second member 240 coupled to the first member 230 to face the cover member 210 with the first member 230 therebetween.

In an embodiment, the first member 230 may be bonded to at least part of the cover member 210 in a direction toward the inside surface 211 of the cover member 210. The first member 230 may include first protrusions 231, second protrusions 237, and the third protrusions 238.

In an embodiment, the first protrusions 231 may prevent a movement of the key assembly 200 inside a key hole (e.g., the key hole 118 of FIGS. 3 and 4) when the key assembly 200 is pressed and released. For example, in a state in which the key assembly 200 is inserted into the key hole 118, the first protrusions 231 may be brought into close contact with an inner wall of the key hole 118 to limit a movement of the key assembly 200 in the length direction (e.g., the first direction DO and/or the width direction (e.g., the second direction D2). The first protrusions 231 may contain an elastic material so as to be elastically deformable when the key assembly 200 is moved.

In an embodiment, the first protrusions 231 may protrude from opposite longitudinal end portions of the first member 230 in the first direction D1. The first direction D1 may refer to the +Y/−Y-axis direction. For example, the first protrusions 231 may include a first protruding portion 231-1 protruding in the +Y-axis direction from one end portion (e.g., an end portion facing the +Y-axis direction) of the first member 230 and a second protruding portion 231-2 protruding in the −Y-axis direction from an opposite end portion (e.g., an end portion facing the −Y-axis direction) of the first member 230. The first protruding portion 231-1 and the second protruding portion 231-2 may have substantially the same shape.

In an embodiment, the first protrusions 231 may each include a first portion 231a extending in the first direction D1 and a second portion 231b curved from the first portion 231a in a direction (e.g., the +X-axis direction) perpendicular to the first direction D1. However, the shapes of the first protrusions 231 are not limited to the illustrated embodiment and may be modified according to various embodiments of the disclosure. Various embodiments of the shapes of the first protrusions 231 will be described below in more detail with reference to FIGS. 6A to 7B and FIGS. 10A to 10C.

In an embodiment, when the key assembly 200 is coupled to the housing (e.g., the housing 110 of FIGS. 1 to 4), the second protrusions 237 may prevent the key assembly 200 from being separated from the key hole (e.g., the key hole 118 of FIG. 3). The second protrusions 237 may be formed of an elastic material so as to be elastically deformable when the key assembly 200 is inserted into the key hole 118. The second protrusions 237 may protrude in the second direction D2 from partial areas (e.g., at least partial areas of a surface facing the +Z/−Z-axis direction) of the first member 230. The second direction D2 may refer to the +Z/−Z-axis direction. For example, the second protrusions 237 may protrude to a predetermined height in the +Z-axis direction from one surface of the first member 230 that faces the +Z-axis direction. Furthermore, the second protrusions 237 may protrude to a predetermined height in the −Z-axis direction from an opposite surface of the first member 230 that faces the −Z-axis direction.

In an embodiment, the second protrusions 237 may be formed to be inclined to allow insertion of the key assembly 200 into the key hole (e.g., the key hole 118 of FIG. 3) when the key assembly 200 is assembled. For example, the second protrusions 237 may include inclined surfaces 237a formed to be inclined in an opposite direction to the protruding direction of the second protrusions 237 along the direction (e.g., the −X-axis direction) in which the key assembly 200 is inserted into the key hole (e.g., the key hole 118 of FIG. 3). For example, the inclined surfaces 237a of the second protrusions 237 protruding in the +Z-axis direction may be formed to be inclined in the −Z-axis direction along the insertion direction (e.g., −X-axis direction) of the key assembly 200. Furthermore, the inclined surfaces 237a of the second protrusions 237 protruding in the −Z-axis direction may be formed to be inclined in the +Z-axis direction along the insertion direction (e.g., −X-axis direction) of the key assembly 200 (e.g., refer to FIGS. 11A, 11B, 11C, and 11D). The shapes of the second protrusions 237 and the operation in which the second protrusions 237 are elastically deformed when the key assembly 200 is assembled will be described below in more detail with reference to FIGS. 11A, 11B, 11C, and 11D.

In an embodiment, the third protrusions 238 may be inserted into the receiving recesses 212 of the cover member 210 and may be bonded to the receiving recesses 212. The third protrusions 238 may be formed in a shape substantially corresponding to the receiving recesses 212. The third protrusions 238 may protrude from one side of the first member 230 to face the inside surface 211 of the cover member 210. For example, the third protrusions 238 may protrude in the +X-axis direction from one surface (e.g., a surface facing the +X-axis direction) of the first member 230 that faces the inside surface 211 of the cover member 210. The third protrusions 238 may be inserted into the receiving recesses 212 and may be bonded to at least parts of inside surfaces of the receiving recesses 212.

In an embodiment, the second member 240 may press switches (e.g., the switches 153 of FIG. 3) when the key assembly 200 is pressed. For example, the second member 240 may include the pressing protrusions 241 that press the switches 153. The pressing protrusions 241 may be formed adjacent to opposite longitudinal end portions of the second member 240. The pressing protrusions 241 may protrude from parts of the second member 240 toward the switches 153 (e.g., in the −X-axis direction).

In an embodiment, the first member 230 and the second member 240 may be formed of an elastic material. For example, the first member 230 and the second member 240 may be formed of the same urethane material. In another embodiment, the first member 230 and the second member 240 may be formed of different materials. The first member 230 may be formed of a material having higher elasticity than the second member 240. For example, the first member 230 may be formed of a urethane material, and the second member 240 may be formed of a polycarbonate (PC) material to ensure a feeling of clicking the key assembly 200. According to various embodiments of the disclosure, considering that the first member 230 includes the first protrusions 231 or the second protrusions 237 that may be required to be elastically deformed, the first member 230 may preferably be formed of a material having a specified elasticity or more. However, the materials of the first member 230 and the second member 240 are not limited to the above-described materials, and various materials may be applicable according to various embodiments of the disclosure.

In an embodiment, the pressing member 220 may be configured such that the first member 230 and the second member 240 are integrally formed with each other. For example, the first member 230 and the second member 240 may be integrally formed with each other through injection molding. The first member 230 may further include a reinforcing portion 239 for preventing deformation of the pressing member 220 in manufacture of the pressing member 220 through injection molding. For example, the reinforcing portion 239 may protrude from at least a partial area of the first member 230. The reinforcing portion 239 may refer to a portion artificially built up to prevent the injection-molded pressing member 220 from being twisted or deformed in a process of being separated or ejected from an injection mold. However, a manufacturing process of the pressing member 220 is not limited to injection molding, and the pressing member 220 may be manufactured by using various manufacturing processes according to various embodiments of the disclosure.

In an embodiment, the first member 230 and the second member 240 may be formed of the same material, or may be formed of different materials. In a case where the first member 230 and the second member 240 are formed of different materials, the first member 230 and the second member 240 may be manufactured through double injection molding. For example, the pressing member 220 including the first member 230 formed of a urethane material and a second member 240 formed of a polycarbonate material may be formed by double injection of the urethane material and the polycarbonate material. However, the first member 230 and the second member 240 are not limited to being integrally formed with each other, and the first member 230 and the second member 240 may be configured to be assembled and/or coupled together after manufactured as separate parts.

FIG. 6A illustrates an operation in which a key assembly is coupled to a housing in an electronic device according to an embodiment of the disclosure.

FIG. 6B illustrates an operation in which a key assembly is coupled to a housing in the electronic device according to an embodiment of the disclosure.

FIG. 6C illustrates an operation in which a key assembly is coupled to a housing in an electronic device according to an embodiment of the disclosure.

FIG. 6A is a view illustrating an operation in which a key assembly is inserted into a key hole of a housing. FIG. 6B is an enlarged view of portion S2 in FIG. 6A. FIG. 6C is a view illustrating a state in which the first protrusions are brought into contact with the key hole depending on insertion of the key assembly in FIG. 6B. At least some of the components of the electronic device illustrated in FIGS. 6A and 6B are identical or similar to the components illustrated in FIGS. 3 to 5. Therefore, repetitive descriptions will hereinafter be omitted.

Referring to FIGS. 6A to 6C, an electronic device 100 according to an embodiment may include a housing 110 having a key hole 118 formed therein and a key assembly 200 coupled to a housing 110 by insertion of at least part of a key assembly 200 into a key hole 118.

In an embodiment, the key assembly 200 may include the cover member 210 and the pressing member 220. Furthermore, the pressing member 220 may include the first protrusions 231 and/or the second protrusions 237 and may include the first member 230 coupled to the cover member 210 and the second member 240 coupled to the first member 230 to face the cover member 210.

FIGS. 6A to 6C illustrate only the second protruding portion 231-2 (e.g., the second protruding portion 231-2 of FIGS. 5A and 5B) formed on one end portion (e.g., an end portion facing the −Y-axis direction) of the first member 230 among the first protrusions 231. However, the first protrusions 231 to be described with reference to FIGS. 6A to 6C may be understood as including both the first protruding portion (e.g., the first protruding portion 231-1 of FIGS. 5A and 5B) and the second protruding portion 231-2 described above with reference to FIGS. 5A and 5B.

The electronic device 100 according to an embodiment may be configured such that the key assembly 200 is coupled or assembled toward the inside of the housing 110 from outside the housing 110. The key assembly 200 may be coupled to the housing 110 by being inserted into the key hole 118 in a state of being located outside the housing 110. For example, when the key assembly 200 is assembled to the housing 110, the key assembly 200 may be located to be aligned with the key hole 118 in the X-axis direction outside the housing 110. In the state in which the key assembly 200 and the key hole 118 are aligned with each other, the pressing member 220 may face the −X-axis direction to face the key hole 118, and the cover member 210 may face the +X-axis direction. The key assembly 200 may be inserted into the key hole 118 in the third direction D3 from outside the housing 110. For example, the key assembly 200 may be inserted into the key hole 118 in the −X-axis direction. According to an embodiment, the direction in which the key assembly 200 is inserted into the key hole 118 may be a direction that is substantially the same as the direction in which the key assembly 200 is pressed when a user clicks the key assembly 200.

In an embodiment, the key assembly 200 may be configured such that when the key assembly 200 is inserted into the key hole 118, at least parts of the first protrusions 231 make contact with the inner wall of the key hole 118 and elastically deform in a predetermined shape by the inner wall of the key hole 118. As the first protrusions 231 are brought into contact with the inner wall of the key hole 118, the first protrusions 231 may prevent a movement of the key assembly 200.

In an embodiment, in the state in which the key assembly 200 is aligned with the key hole 118 in the X-axis direction before inserted into the key hole 118, the first protrusions 231 may further protrude beyond end portions of the key hole 118 in the first direction D1 by a predetermined length (e.g., an overlap thickness t) (FIG. 6B). In the state in which the key assembly 200 and the key hole 118 are aligned with each other in the X-axis direction, the first protrusions 231 may overlap the key hole 118 by the overlap thickness t when the key assembly 200 is viewed in the −X-axis direction. For example, as illustrated in FIGS. 6A to 6C, the second protruding portions 231-2 of the first protrusions 231 may further protrude beyond the key hole 118 in the −Y-axis direction by the overlap thickness t. Furthermore, although not illustrated in FIGS. 6A to 6C, the first protruding portions (e.g., the first protruding portions 231-1 of FIGS. 5A and 5B) of the first protrusions 231 may further protrude beyond the key hole 118 in the +Y-axis direction by the overlap thickness t. For example, the distance (e.g., a distance h3 of FIGS. 5A and 5B) between the pair of first protrusions 231 (e.g., the first protruding portions 231-1 and the second protruding portions 231-2 of FIGS. 5A and 5B) that protrude from opposite end portions of the pressing member 220 in the first direction D1 (e.g., the +Y/−Y-axis direction) may be longer than the length of the key hole 118 (e.g., the length h1 of FIG. 3) in the direction of the major axis by a predetermined length (e.g., a length substantially two times greater than the overlap thickness t).

In an embodiment, when the key assembly 200 is inserted into the key hole 118, the first protrusions 231 may be inserted while being elastically deformed in a predetermined shape by the inner wall of the key hole 118. As the first protrusions 231 further protrude beyond the key hole 118 in the first direction D1, the first protrusions 231 may more effectively prevent a movement of the key assembly 200 inside the key hole 118 in the length direction of the key assembly 200 (e.g., the first direction D1 or the Y-axis direction) and/or the width direction of the key assembly 200 (e.g., the second direction D2 or the Z-axis direction in FIGS. 3 to 5). For example, when the key assembly 200 is inserted into the key hole 118, at least parts of the first protrusions 231 may be inserted while being elastically deformed depending on an external force applied by the inner wall of the key hole 118. When the key assembly 200 is inserted into the key hole 118, the first protrusions 231 may apply restoring forces to the inner wall of the key hole 118 due to a property of returning to the state before the deformation. A movement of the key assembly 200 inside the key hole 118 may be limited by the restoring forces of the first protrusions 231.

In an embodiment, the length (e.g., the overlap thickness t) by which the first protrusions 231 further protrude beyond the key hole 118 may determine the degree to which the first protrusions 231 overlap the inner wall of the key hole 118 when the key assembly 200 is inserted into the key hole 118. When the overlap thickness t is too great, a click operation of the key assembly 200 may be obstructed due to a high degree of overlap between the first protrusions 231 and the inner wall of the key hole 118. Furthermore, when the overlap thickness t is too small, an effect of preventing a movement of the key assembly 200 may not be sufficiently obtained due to a low degree of overlap between the first protrusions 231 and the inner wall of the key hole 118. In various embodiments of the disclosure, the overlap thickness t may be formed to be a length by which a click operation of the key assembly 200 is not obstructed and a movement of the key assembly 200 is prevented. For example, the overlap thickness t may range from about 0.01 mm to about 0.05 mm and may preferably be about 0.03 mm. However, the overlap thickness t is not limited to the numerical range.

In an embodiment, the first protrusions 231 may include the first portions 231a extending from the opposite longitudinal end portions of the first member 230 in the first direction D1 and the second portions 231b extending from the first portions 231a in the direction substantially perpendicular to the first direction D1.

In an embodiment, the second portions 231b may extend in the opposite direction to the direction in which the key assembly 200 is inserted into the key hole 118. For example, the second portions 231b may extend from ends of the first portions 231a in a fourth direction D4 (e.g., the +X-axis direction) opposite to the third direction D3 (e.g., the −X-axis direction). As the second portions 231b of the first protrusions 231 extend in the opposite direction (e.g., the fourth direction D4) to the direction (e.g., the third direction D3) in which the key assembly 200 is inserted, the key assembly 200 may be configured such that the second portions 231b are easily inserted without being turned inside out by friction with the inner wall of the key hole 118 when the key assembly 200 is inserted into the key hole 118. For example, in a case where the second portions 231b extend from the first portions 231a in the third direction D3 unlike in the illustrated embodiment, the second portions 231b may be stopped by a peripheral portion of the key hole 118 to obstruct the insertion of the key assembly 200 when the key assembly 200 is inserted into the key hole 118. Furthermore, while making contact with the inner wall of the key hole 118, the second portions 231b may be elastically deformed in a form turned inside out in the fourth direction D4. In such a case, the degree to which the first protrusions 231 and the inner wall of the key hole 118 overlap each other may be increased, and restoring forces that return the second portions 231b turned inside out the original shapes may obstruct a click operation of the key assembly 200.

In an embodiment, the first protrusions 231 may each include at least one of a curved surface and an inclined surface. The first protrusions 231 may each include a contact surface 236 facing the inner wall of the key hole 118, and at least a partial area of the contact surface 236 may be brought into contact with the inner wall of the key hole 118 in the state in which the key assembly 200 is inserted into the key hole 118. The contact surface 236 may include at least one of a curved surface and an inclined surface. For example, at least part of the contact surface 236 may be formed to be a curved surface or an inclined surface. Furthermore, for example, the contact surface 236 may be formed in a form in which a cured surface and an inclined surface are connected with each other.

In an embodiment, the second portions 231b of the first protrusions 231 may each include the contact surface 236. For example, the contact surface 236 may be a chamfer area formed by cutting the corner portion where the first portion 231a and the second portion 231b are connected. In various embodiments of the disclosure, the chamfer area may have a flat shape or a rounded shape. In an embodiment, the second portion 231b may include the contact surface 236 in a curved form. For example, the first protrusions 231 may be formed in a form in which the second portion 231b is curved from the first portion 231a in the opposite direction to the third direction D3. The contact surface 236 may be formed to be a curved surface that is curved in the direction in which the second portion 231b extends.

In the key assembly 200 according to an embodiment, at least part of the contact surface 236 of the second portion 231b brought into contact with the inner wall of the key hole 118 may be formed to be a curved surface and/or an inclined surface. For example, the contact surface 236 may be formed in a shape inclined toward the first portion 231a along the third direction D3. Accordingly, when the key assembly 200 is inserted into the key hole 118, the key assembly 200 may be inserted while the peripheral portion of the key hole 118 relatively moves along the contact surface 236. Furthermore, deterioration in a feeling of operation when the key assembly 200 is clicked may be prevented by allowing only partial sections (e.g., partial areas of the contact surfaces 236) of the first protrusions 231 to be brought into contact with the inner wall of the key hole 118 in the state in which the key assembly 200 is completely inserted into the key hole 118.

According to the embodiment illustrated in FIGS. 6A to 6C, the first protrusions 231 may each include the first portion 231a and the second portion 231b extending from the first portion 231a in the opposite direction to the insertion direction of the key assembly 200. However, this is illustrative, and without being limited to the illustrated embodiment, according to various embodiments of the disclosure, the first protrusions 231 may include only the first portions 231a extending from the opposite end portions of the first member 230 in the first direction D1. In such a case, the contact surfaces 236 may be formed on the first portions 231a. Embodiments of the first protrusions 231 not including the second portions 231b will be described below with reference to FIGS. 7A and 7B.

Figure 7A:
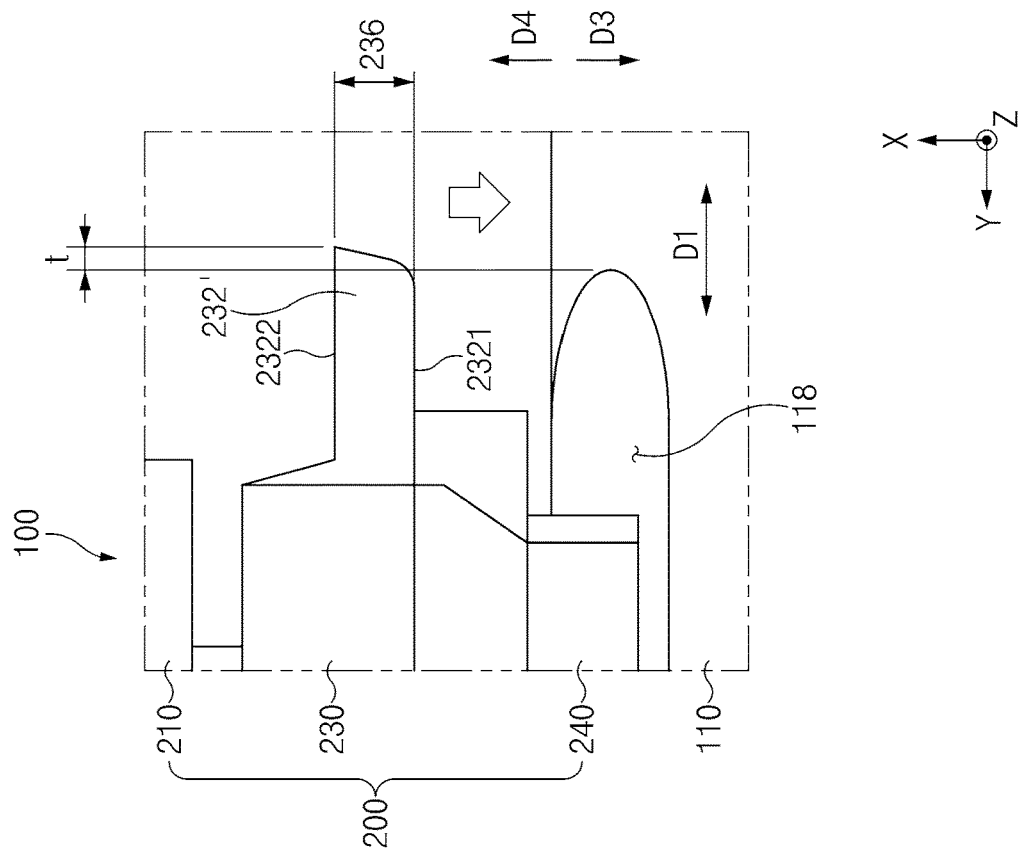
FIG. 7A illustrates various forms of first protrusions of a key assembly in an electronic device according to an embodiment of the disclosure.

FIG. 7A illustrates various forms of first protrusions of a key assembly in an electronic device according to an embodiment of the disclosure.

Figure 7B:
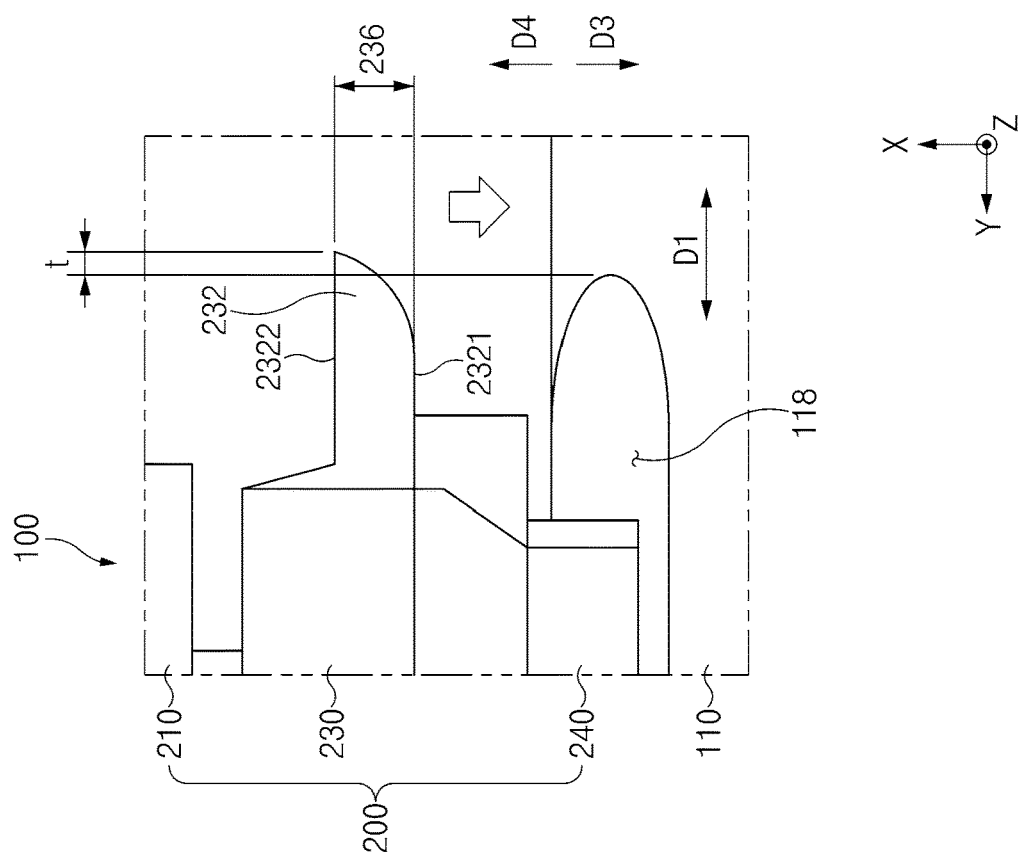
FIG. 7B illustrates various forms of first protrusions of a key assembly in an electronic device according to an embodiment of the disclosure.

FIG. 7B illustrates various forms of first protrusions of a key assembly in an electronic device according to an embodiment of the disclosure.

FIGS. 7A and 7B illustrate various embodiments in which the forms of the first protrusions are modified in the electronic device illustrated in FIGS. 6A to 6C. Hereinafter, repetitive contents will be omitted, and the following description will be focused on a difference from the embodiment illustrated in FIGS. 6A to 6C.

Referring to FIGS. 7A and 7B, an electronic device 100 according to an embodiment may include a housing 110 having a key hole 118 formed therein and a key assembly 200 that includes a cover member 210 and a pressing member 220 (e.g., a first member 230 and a second member 240) and that is at least partially inserted into a key hole 118.

The first member 230 may include first protrusions 232 or 232' for preventing a movement of the key assembly 200 inside the key hole 118.

FIGS. 7A and 7B illustrate only the first protrusion 232 or 232' (e.g., the second protruding portion 231-2 of FIGS. 5A and 5B) formed on one end portion (e.g., an end portion facing the −Y-axis direction) of the first member 230. However, the first protrusions 232 or 232' to be described with reference to FIGS. 6A to 6C may be understood as including the first protruding portion (e.g., the first protruding portion 231-1 of FIGS. 5A and 5B) and the second protruding portion (e.g., the second protruding portion 231-2 of FIGS. 5A and 5B) described above with reference to FIGS. 5A and 5B.

In an embodiment, the first protrusions 232 or 232' may protrude from end portions of the first member 230. For example, the first protrusions 232 or 232' may extend from the end portions of the first member 230 in the first direction D1. Unlike the first protrusions 231 described above with reference to FIGS. 6A to 6C, the first protrusions 232 or 232' according to the embodiments illustrated in FIGS. 7A and 7B may not include the first portion 231a and the second portion 231b extending from the first portion 231a.

In an embodiment, in the state in which the key assembly 200 is aligned with the key hole 118 in the X-axis direction before inserted into the key hole 118, the first protrusions 232 or 232' may further protrude beyond the end portions of the key hole 118 in the first direction D1 by a predetermined length (e.g., the overlap thickness t). In the state in which the key assembly 200 and the key hole 118 are aligned with each other in the X-axis direction, the first protrusions 232 or 232' may overlap the key hole 118 by the overlap thickness t when the key assembly 200 is viewed in the −X-axis direction.

In an embodiment, the first protrusions 232 or 232' may include contact surfaces 236 facing the inner wall of the key hole 118. For example, the contact surfaces 236 may refer to end surfaces facing the first direction D1 (e.g., the +Y/−Y-axis direction) in the first protrusions 232 or 232'. At least partial areas of the contact surfaces 236 may be brought into contact with the inner wall of the key hole 118 in the state in which the key assembly 200 is inserted into the key hole 118. Each of the contact surfaces 236 may include at least one of a curved surface and an inclined surface. For example, at least part of the contact surface 236 may be formed to be a curved surface, or may be formed to be an inclined surface. Furthermore, for example, the contact surface 236 may be formed in a form in which a cured surface and an inclined surface are connected with each other.

As illustrated in FIG. 7A, the contact surface 236 of each of the first protrusions 232 may be formed to be a curved surface. For example, the first protrusion 232 may include a first surface 2321 facing toward the second member 240 and a second surface 2322 facing away from the first surface 2321. The contact surface 236 may be a surface connecting an end portion of the first surface 2321 and an end portion of the second surface 2322 in the X-axis direction. The contact surface 236 may be formed to be a curved surface extending from the end portion of the first surface 2321 to the end portion of the second surface 2322 so as to have a specified curvature. For example, the contact surface 236 may be formed in a shape inclined in the protruding direction of the first protrusion 231 (e.g., the +Y-axis direction in the case of the first protruding portion 231-1 of FIGS. 5A and 5B and the −Y-axis direction in the case of the second protruding portion 231-2 of FIGS. 5A and 5B) along the fourth direction D4. However, without being limited to the illustrated embodiment, according to various embodiments of the disclosure, a partial area of the contact surface 236 connected with the second surface 2322 may be formed to be a flat surface parallel to the third direction D3.

As illustrated in FIG. 7B, the contact surface 236 of each of the first protrusions 232' may be formed such that a curved surface and an inclined surface are connected. For example, the first protrusion 232' may include a first surface 2321 facing toward the second member 240 and a second surface 2322 facing away from the first surface 2321. The contact surface 236 may be a surface connecting an end portion of the first surface 2321 and an end portion of the second surface 2322 in the X-axis direction. The contact surface 236 may be formed to be an inclined surface extending from the end portion of the first surface 2321 to the end portion of the second surface 2322 so as to have a specified slope. The corner portion where the contact surface 236 and the first surface 2321 meet may be formed to be a curved surface (e.g., a chamfer area). For example, the contact surface 236 may be formed in a shape inclined in the protruding direction of the first protrusion 232' (e.g., the +Y-axis direction in the case of the first protruding portion 231-1 of FIGS. 5A and 5B and the −Y-axis direction in the case of the second protruding portion 231-2 of FIGS. 5A and 5B) along the fourth direction D4. However, without being limited to the illustrated embodiment, according to various embodiments of the disclosure, the corner portion where the contact surface 236 and the first surface 2321 meet may be formed to be a chamfer area in a flat form rather than a chamfer area in a rounded surface form.

According to the embodiments illustrated in FIGS. 7A and 7B, at least part of the contact surface 236 of each of the first protrusions 232 and 232' brought into contact with the inner wall of the key hole 118 may be formed to be a curved surface and/or an inclined surface. Accordingly, when the key assembly 200 is inserted into the key hole 118, the key assembly 200 may be inserted while the peripheral portion of the key hole 118 relatively moves along the contact surface 236. Furthermore, in the state in which the key assembly 200 is completely inserted into the key hole 118, only partial sections (e.g., partial areas of the contact surfaces 236) of the first protrusions 232 and 232' may be brought into contact with the inner wall of the key hole 118.

Figure 8C:
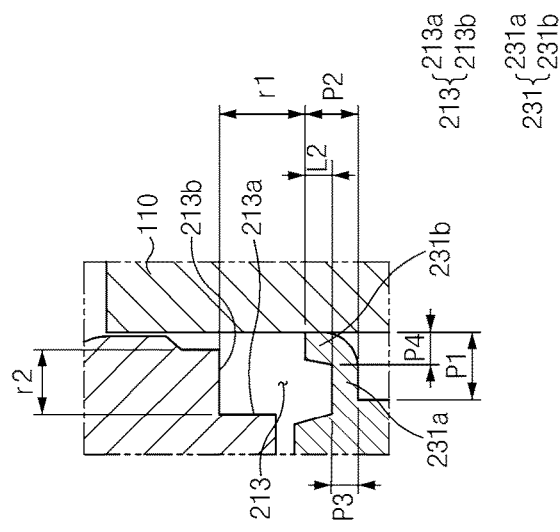
FIGS. 8A, 8B, and 8C are sectional views illustrating an operation in which a key assembly coupled to a housing of an electronic device is pressed according to embodiments of the disclosure.
Figure 8A:
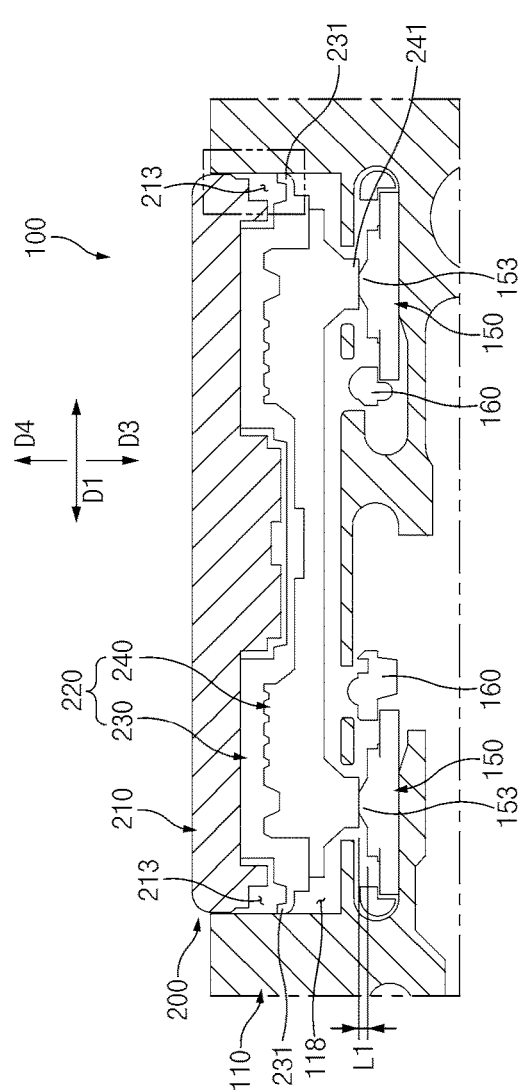
Figure 8B:
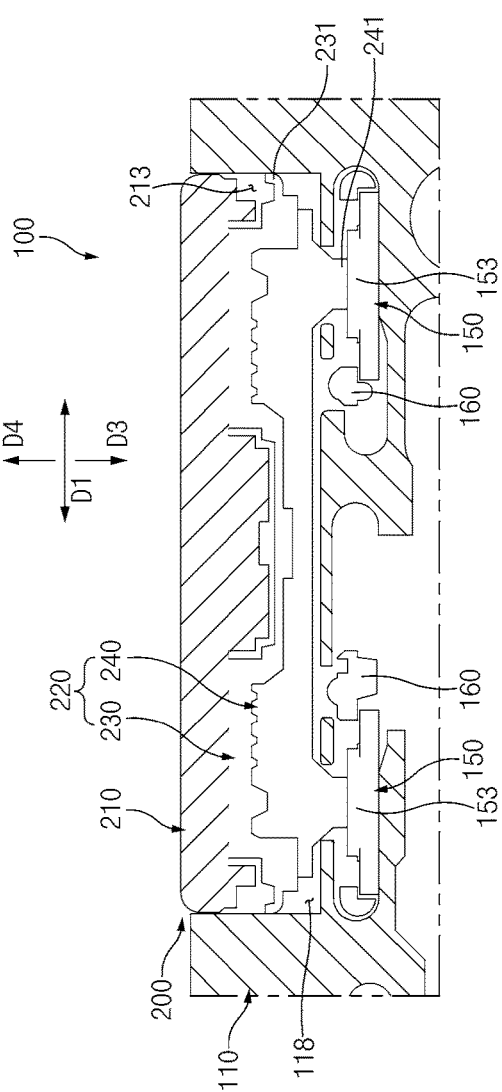

FIGS. 8A, 8B, and 8C are sectional views illustrating an operation in which a key assembly coupled to a housing of an electronic device is pressed according to embodiments of the disclosure.

Figure 9A:
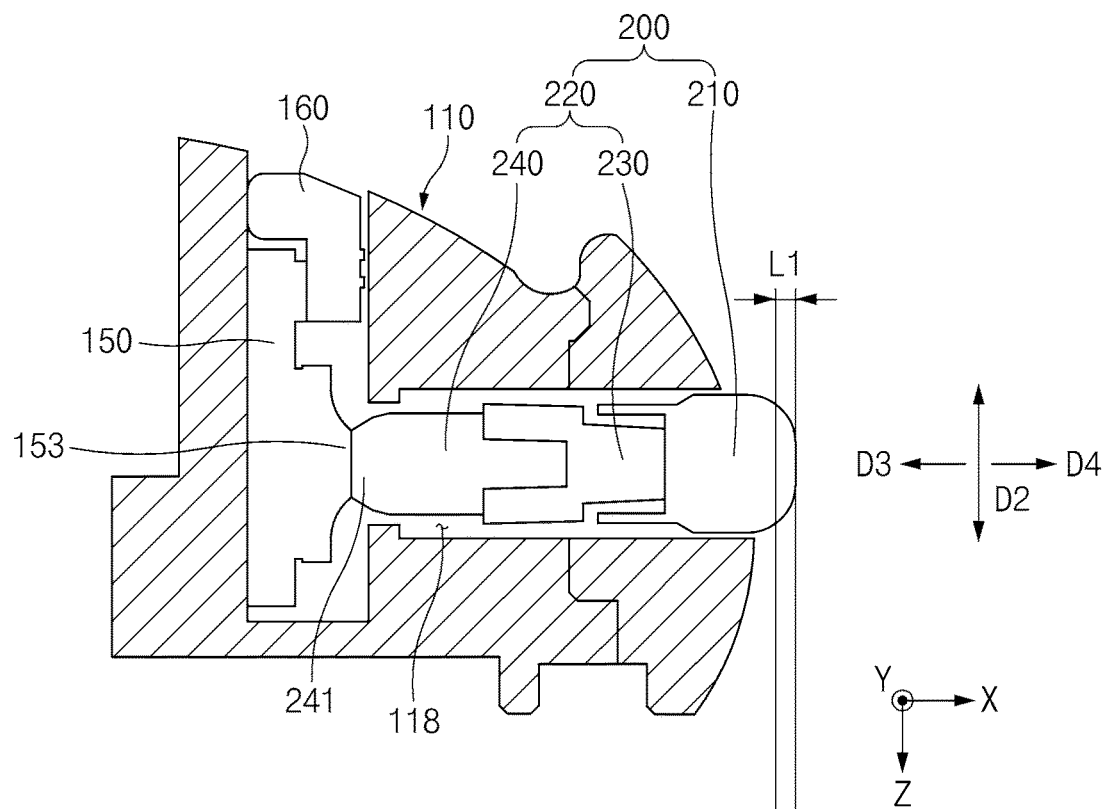
FIGS. 9A and 9B are sectional views illustrating an operation in which a key assembly coupled to a housing of an electronic device is pressed according to embodiments of the disclosure.
Figure 9B:
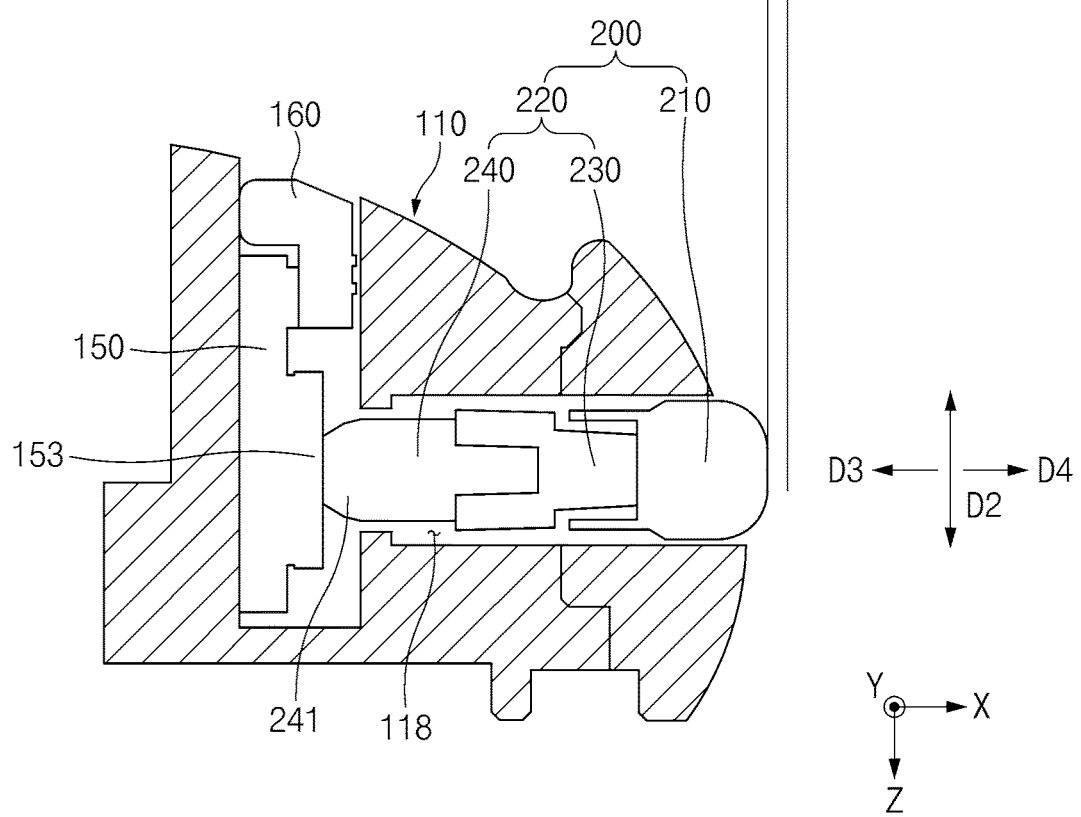

FIGS. 9A and 9B are sectional views illustrating an operation in which a key assembly coupled to a housing of an electronic device is pressed according to embodiments of the disclosure.

FIGS. 8A, 8B, and 8C are sectional views illustrating the operation in which the key assembly is pressed, where FIGS. 8A, 8B, and 8C are taken along line A-A' of FIG. 3. FIGS. 9A and 9B are sectional views illustrating the operation in which the key assembly is pressed, where FIGS. 9A and 9B are taken along line B-B' of FIG. 4. For example, FIGS. 8A, 8B, 8C, 9A, and 9B illustrate a process in which the key assembly is moved in the key hole by an operation of clicking the key assembly.

Referring to FIGS. 8A, 8B, 8C, 9A, and 9B, an electronic device 100 according to an embodiment may include a housing 110 having a key hole 118 formed therein, a key circuit board 150 disposed inside a housing 110 and equipped with switches 153, a key bracket 160 supporting a key circuit board 150, and a key assembly 200 movably inserted into a key hole 118.

In an embodiment, the key assembly 200 may be inserted into the key hole 118, and at least part (e.g., the first protrusions 231) of the key assembly 200 may be brought into contact with the inner wall of the key hole 118. The key assembly 200 may include the cover member 210 that has at least a portion disposed outside the key hole 118 and to which an external force is applied by a user and the pressing member 220 that is coupled to the cover member 210 so as to be located inside the key hole 118 and that includes the first member 230 and the second member 240.

According to an embodiment, when the user applies the external force to the cover member 210 in the third direction D3, the key assembly 200 may move in the third direction D3 by the first length L1. Accordingly, the pressing protrusions 341 may press the switches 153, and the shapes of parts of the switches 153 may be elastically deformed. Furthermore, when the user removes the external force applied to the cover member 210, the shapes of the elastically deformed switches 153 may be restored, and thus the key assembly 200 may move in the fourth direction D4 opposite to the third direction D3 by the first length L1 to return to the state prior to being pressed.

In an embodiment, a movement of the key assembly 200 in the first direction D1 or the second direction D2 may be prevented by the first protrusions 231 brought into contact with the inner wall of the key hole 118. For example, the first protrusions 231 may be elastically deformed in the process in which the key assembly 200 is inserted into the key hole 118. The elastically deformed first protrusions 231 may remain brought into contact with the inner wall of the key hole 118 in the first direction D1, and a movement of the key assembly 200 may be prevented by elastic restoring forces of the first protrusions 231 that act on the inner wall of the key hole 118.

In an embodiment, the first member 230 may be formed of an elastic material. The first member 230 may include the first protrusions 231 that protrude from the opposite end portions of the first member 230 in the first direction D1 and that are at least partially elastically deformable. The first protrusions 231 may be brought into contact with the inner wall of the key hole 118 in the first direction D1 in the state in which the key assembly 200 is coupled to the housing 110. The first protrusions 231 may be configured to partially elastically deform in response to a movement of the key assembly 200 depending on a pressing operation in a state of being brought into close contact with the inner wall of the key hole 118.

In an embodiment, the second member 240 may include the pressing protrusions 241 configured to press the switches 153 when the key assembly 200 is pressed. The pressing protrusions 241 may be brought into contact with the switches 153. The pressing protrusions 241 may protrude in a convex shape from one surface of the second member 240 toward the switches 153. For example, the pressing protrusions 241 may remain brought into contact with at least partial areas of the switches 153 irrespective of an operation of pressing the key assembly 200.

In an embodiment, as the key assembly 200 is moved by a specified distance (e.g., the first length L1) in the third direction D3 by a pressing operation, the pressing protrusions 241 may press the switches 153 in the third direction D3. The forms of dome portions (e.g., portions convexly protruding in the fourth direction D4) of the switches 153 may be elastically deformed in the third direction D3 by the pressing protrusions 241. When the pressure applied to the key assembly 200 is released, the dome portions of the switches 153 may move the key assembly 200 by the specified distance (e.g., the first length L1) in the fourth direction D4 while returning to the original state prior to being pressed. For example, electrical signals generated by the elastic deformation of the switches 153 (e.g., the dome portions) may be transferred to the control circuitry (e.g., the processor 320 of FIG. 12) through the contact terminals 154 connected with the main circuit board (not illustrated) (e.g., a PCB or an FPCB) disposed inside the housing 110.

In an embodiment, the first protrusions 231 may be spaced at specified intervals from opposite end portions of the cover member 210 in the length direction (e.g., the +Y/−Y-axis direction) so as not to interfere with the cover member 210 when the key assembly 200 is pressed in the third direction D3. For example, the first protrusions 231 may be disposed to be spaced apart from the opposite end portions of the cover member 210 in the −Z-axis direction. To ensure separation spaces between the cover member 210 and the first protrusions 231, the cover member 210 may include recesses 213 formed on the opposite end portions of the cover member 210.

In an embodiment, the recesses 213 may be aligned to face the first protrusions 231 in the Z-axis direction and may provide spaces by which the first protrusions 231 and the opposite end portions of the cover member 210 are spaced apart from each other. For example, the recesses 213 may be formed by cutting away partial areas from the opposite end portions of the cover member 210. The recesses 213 may each include a first area 213a facing toward the inside of the housing 110 (e.g., the third direction D3 or the −X-axis direction) and a second area 213b extending perpendicular to the first area 213a. The recesses 213 may be formed in consideration of the shapes and/or sizes of the first protrusions 231. For example, the distances r1 between the first areas 213a of the recesses 213 and the first protrusions 231 in the X-axis direction may be greater than the lengths P1 (e.g., the lengths in the Y-axis direction) of the first protrusions 231. Furthermore, for example, the lengths r2 of the recesses 213 in the Y-axis direction may be greater than the heights P2 (e.g., the lengths in the X-axis direction) of the first protrusions 231. However, without being limited thereto, according to various embodiments of the disclosure, the shapes and/or sizes of the recesses 213 may be modified in a range in which interference between the first protrusions 231 and the cover member 210 does not occurs.

In an embodiment, the first protrusions 231 may include the first portions 231a extending from the opposite end portions of the first member 230 in the first direction D1 and the second portions 231b extending from the first portions 231a in the opposite direction to the direction in which the key assembly 200 is pressed. For example, the key assembly 200 may be pressed in the third direction D3, and the second portions 231b may extend from the first portions 231a in the fourth direction D4. As described above with reference to FIGS. 6A to 6C, the key assembly 200 according to the embodiment of the disclosure may be inserted into the key hole 118 in the third direction D3 from outside the housing 110, and the direction in which the key assembly 200 is pressed (or, clicked) may be the third direction D3 substantially the same as the direction in which the key assembly 200 is inserted (or, assembled). As described above, according to an embodiment, the first protrusions 231 may include the second portions 231b extending in the opposite direction to the insertion direction and the pressing direction of the key assembly 200. Accordingly, the first protrusions 231 may prevent a movement of the key assembly 200 without deterioration in a feeling of clicking the key assembly 200.

In an embodiment, the first protrusions 231 may be formed such that a difference in height between the first portions 231a and the second portions 231b in the Z-axis direction is greater than a travel distance (e.g., a key stroke) of the key assembly 200. For example, the second portions 231b may protrude from the first portions 231a in the fourth direction D4 by a second length L2. The second length L2 may be greater than the first length L1 that is the distance that the key assembly 200 moves in the third direction D3 and the fourth direction D4 as the key assembly 200 is pressed or released. Accordingly, the second portions 231b may not be turned inside out even though the key assembly 200 moves in the key hole 118 by the first length L1 when the key assembly 200 is clicked. According to various embodiments of the disclosure, the first length L1 may range from about 0.08 mm to about 0.18 mm and may preferably be about 0.13 mm. The second length L2 may be about 0.22 mm that is greater than 0.18 mm, which is an available numerical value of the first length L1, by 0.04 mm. However, the first length L1 and the second length L2 are not limited to the numerical range.

In an embodiment, the first protrusions 231 may be formed in consideration of maintaining a feeling of clicking the key assembly 200 and a movement prevention effect. For example, the feeling of clicking the key assembly 200 and the movement prevention effect may be determined depending on the thicknesses and lengths of the first protrusions 231 and/or the overlap lengths (e.g., the overlap thickness t of FIGS. 6B, 7A, and 7B) by which the first protrusions 231 overlap the inner wall of the key hole 118. The first protrusions 231 may be formed in a shape capable of preventing a movement of the key assembly 200 while maintaining a feeling of clicking the key assembly 200. For example, the lengths P1 of the first protrusions 231 may be about 0.64 mm, the thicknesses P3 of the first portions 231a may be about 0.25 mm, and the thicknesses of the second portions P4 may range from about 0.25 mm to about 0.3 mm. However, without being limited to the numerical range, according to various embodiments of the disclosure, the shapes of the first protrusions 231 may be modified within a range in which a feeling of clicking the key assembly 200 is not deteriorated.

Figure 10A:
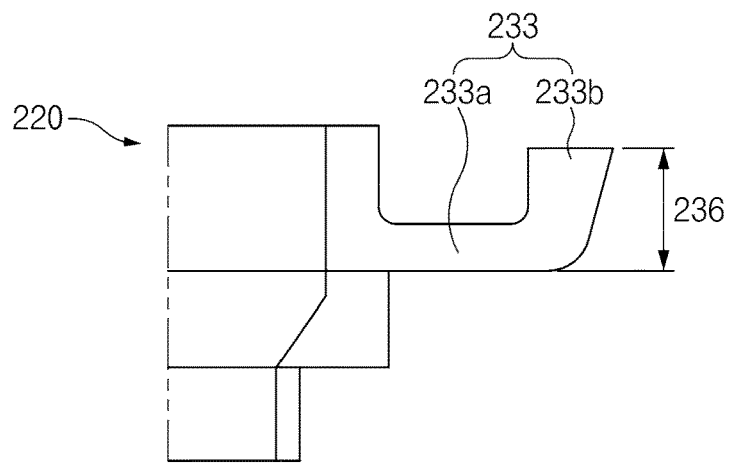
FIG. 10A illustrates various forms of first protrusions of a key assembly in an electronic device according to an embodiment of the disclosure.

FIG. 10A illustrates various forms of first protrusions of a key assembly in an electronic device according to an embodiment of the disclosure.

Figure 10B:
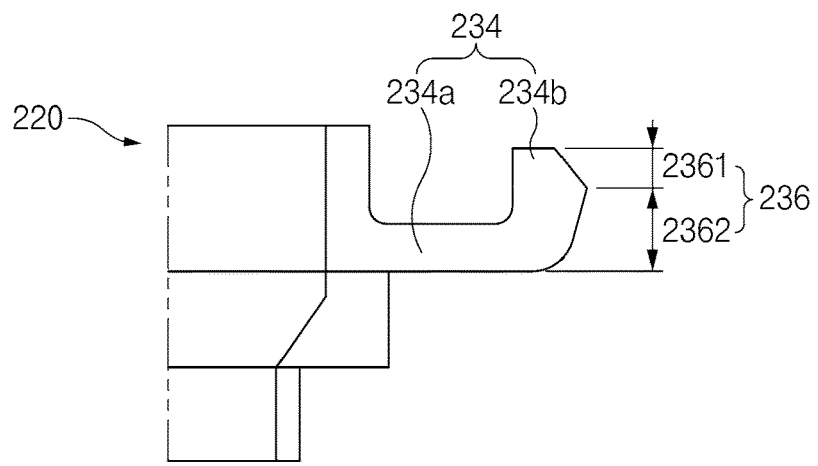
FIG. 10B illustrates various forms of first protrusions of a key assembly in an electronic device according to an embodiment of the disclosure.

FIG. 10B illustrates various forms of first protrusions of a key assembly in an electronic device according to an embodiment of the disclosure.

Figure 10C:
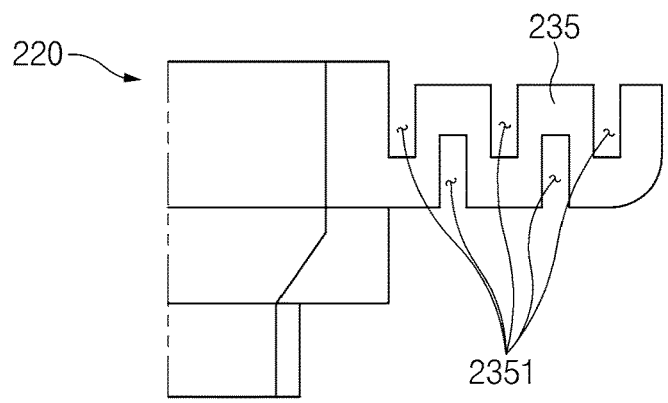
FIG. 10C illustrates various forms of first protrusions of a key assembly in an electronic device according to an embodiment of the disclosure.
Figure 11A:
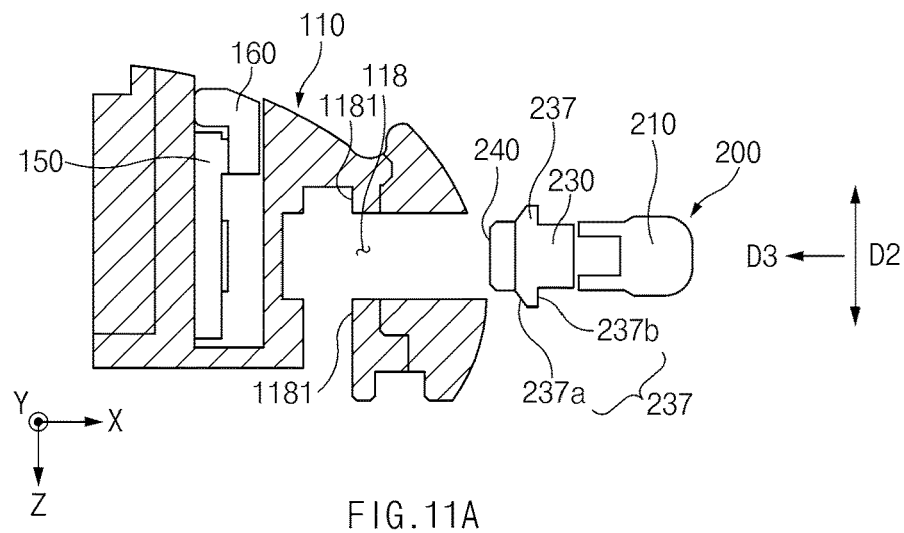
FIGS. 11A, 11B, 11C, and 11D are sectional views illustrating an operation in which a key assembly of an electronic device is inserted into a key hole according to embodiments of the disclosure.
Figure 11B:
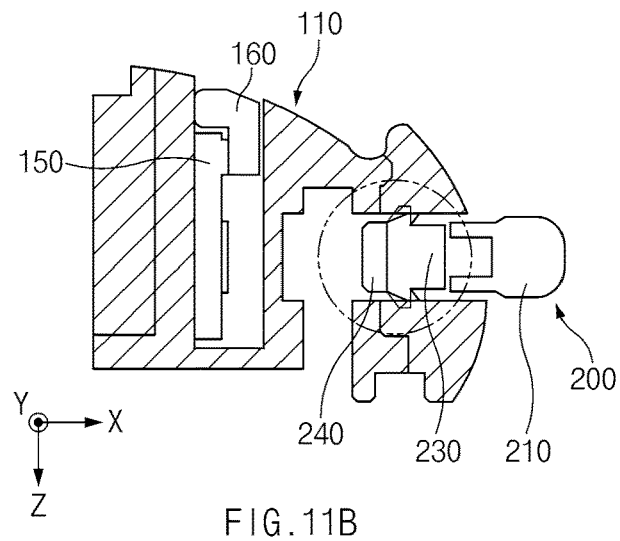
Figure 11D:
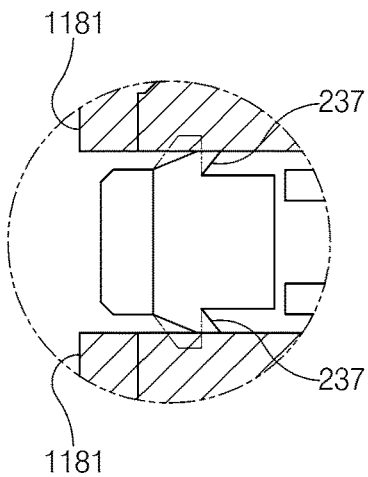
Figure 11C:
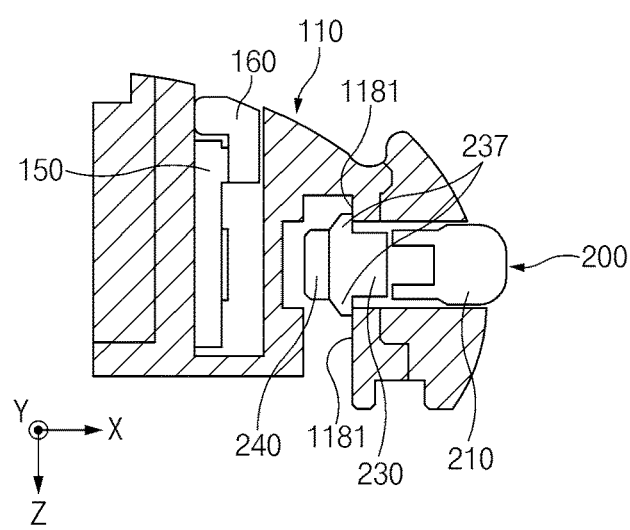

FIG. 10C illustrates various forms of first protrusions of a key assembly in an electronic device according to an embodiment of the disclosure.

Referring to FIGS. 10A to 10C, key assemblies (e.g., the key assembly 200 of FIGS. 1 to 9) according to embodiments may include pressing members 220 having first protrusions 233, 234, and 235 formed thereon. The first protrusions 233, 234, and 235 may be formed in various forms according to embodiments of the disclosure.

The first protrusions 233, 234, and 235 having various forms illustrated in FIGS. 10A to 10C have substantially the same function as, or a function similar to, the function of the first protrusions 231 and 232 described above with reference to FIGS. 5 to 9, and there is a difference in shape therebetween. Hereinafter, repetitive contents will be omitted, and the following description will be focused on the difference.

Referring to FIG. 10A, each of the first protrusions 233 may include a first portion 233a and a second portion 233b extending in a direction substantially perpendicular to the first portion 233a. In an embodiment, the second portion 233b of the first protrusion 233 may include a contact surface 236 at least partially making contact with an inner wall of a key hole (e.g., the key hole 118 of FIGS. 3 and 4). The contact surface 236 may include an inclined surface and a curved surface. For example, the contact surface 236 of the second portion 233b may be formed in a form in which the curved surface and the inclined surface are connected. Unlike in the first protrusions 231 illustrated in FIGS. 6A to 6C, in the first protrusion 233 illustrated in FIG. 10A, the entire contact surface 236 of the second portion 233b may not be formed to be a curved surface, the area where the first portion 233a and the second portion 233b are connected may be formed to be a curved surface, and the remaining area may be formed to be a flat surface having a slope.

Referring to FIG. 10B, each of the first protrusions 234 may include a first portion 234a and a second portion 234b extending in a direction substantially perpendicular to the first portion 234a. In an embodiment, the second portion 234b of the first protrusion 234 may include a contact surface 236. The contact surface 236 may include an inclined surface and a curved surface. For example, the contact surface 236 of the second portion 233b may be formed in a form in which the curved surface and the inclined surface are connected. In an embodiment, the first protrusion 234 may be formed such that a partial area of the contact surface 236 and the remaining area thereof are inclined in opposite directions. The contact surface 236 may include a first area 2362 connected with the first portion 234a and formed to be inclined outward along the direction in which the second portion 234b extends and a second area 2361 that extends from the first area 2362 and that is formed to be inclined in a direction opposite to the direction in which the first area 2362 is inclined. For example, the first protrusion 234 illustrated in FIG. 10B may be formed by chamfering an end portion of the second portion 233b such that a chamfer area is formed on the end portion of the second portion 233b in the first protrusion 233 illustrated in FIG. 10A.

Referring to FIG. 10C, each of the first protrusions 235 may include a plurality of elastic recesses 2351. In an embodiment, the first protrusion 235 may be formed in a form curved and/or bent a plurality of times in the protruding direction of the first protrusion 235 such that at least one portion and another portion face each other. For example, the first protrusion 235 may include the plurality of elastic recesses 2351 arranged so as not to be aligned with one another, and one portion and another portion of the first protrusion 235 may face each other with the elastic recess 2351 therebetween. According to the embodiment illustrated in FIG. 10C, by forming the plurality of elastic recesses 2351 by cutting away partial areas from the first protrusion 235, the first protrusion 235 may be configured to be elastically deformable.

FIGS. 11A, 11B, 11C, and 11D are sectional views illustrating an operation in which a key assembly of an electronic device is inserted into a key hole according to embodiments of the disclosure.

FIGS. 11A, 11B, 11C, and 11D are sectional views illustrating the operation in which the key assembly is inserted into the key hole, where FIGS. 11A, 11B, 11C, and 11D are taken along line C-C' of FIG. 3.

Referring to FIGS. 11A, 11B, 11C, and 11D, an electronic device 100 according to an embodiment may include a housing 110, a key circuit board 150, a key bracket 160, and a key assembly 200.

In an embodiment, the key assembly 200 may be inserted into the key hole 118 in the third direction D3 from outside the housing 110. The key assembly 200 may include the cover member 210 and the pressing member (the first member 230 and the second member 240). At least part of the cover member 210 may be exposed outside the housing 110. The first member 230 may prevent the key assembly 200 from being separated from the key hole 118 in the state in which the key assembly 200 is inserted into the key hole 118.

In an embodiment, the first member 230 may include the second protrusions 237 (e.g., refer to the second protrusions 237 of FIG. 5) that are seated on steps 1181 inside the housing 110. The second protrusions 237 may protrude from partial areas of the first member 230 in a direction substantially perpendicular to the insertion direction of the key assembly 200. For example, the second protrusions 237 may protrude from the partial areas of the first member 230 in the second direction D2. The second protrusions 237 may be formed on one surface and an opposite surface of the first member 230 that face the second direction D2. For example, the second protrusions 237 may protrude in the +Z-axis direction from one surface (e.g., a surface facing the +Z-axis direction) of the first member 230. Furthermore, the second protrusions 237 may protrude in the −Z-axis direction from an opposite surface (e.g., a surface facing the −Z-axis direction) of the first member 230 that faces away from the one surface.

In an embodiment, the second protrusions 237 may include the inclined surfaces 237a and vertical surfaces 237b. The vertical surfaces 237b may extend from the first member 230 in the second direction D2. The inclined surfaces 237a may obliquely extend from the vertical surfaces 237b. The inclined surfaces 237a may be brought into contact with the inner wall of the key hole 118 when the key assembly 200 is inserted into the key hole 118. The inclined surfaces 237a may be formed to be inclined in a direction corresponding to the insertion direction of the key hole 118. For example, the second protrusions 237 formed on the one surface (e.g., the surface facing the +Z-axis direction) of the first member 230 may include the inclined surfaces 237a that are inclined in the −Z-axis direction along the third direction D3. Furthermore, the second protrusions 237 formed on the opposite surface (e.g., the surface facing the −Z-axis direction) of the first member 230 may include the inclined surfaces 237a inclined in the +Z-axis direction along the third direction D3.

In an embodiment, the second protrusions 237 may move along the inner wall of the key hole 118 in the process in which the key assembly 200 is inserted. The second protrusions 237 may be formed of an elastic material so as to be elastically deformable by the inner wall of the key hole 118 when the key assembly 200 is inserted into the key hole 118. For example, the second protrusions 237 may pass through the key hole 118 in the third direction D3 in the process in which the key assembly 200 is inserted into the key hole 118. The second protrusions 237 may be elastically deformed inside the key hole 118 by the inner wall of the key hole 118 and may be returned to the original state by elastic restoring forces after passing through the key hole 118.

In an embodiment, the second protrusions 237 may be seated on the steps 1181 in the state in which the key assembly 200 is completely inserted into the key hole 118. For example, the housing 110 may include the steps 1181 extending from the inner wall of the key hole 118 in a vertical direction. The second protrusions 237 may return to the original shapes after passing through the key hole 118 and may be maintained in the state in which the vertical surfaces 237b of the second protrusions 237 are seated on the steps 1181. As the second protrusions 237 are seated on the steps 1181 inside the housing 110, the second protrusions 237 may prevent the key assembly 200 from being separated outside the housing 110.

Figure 12:
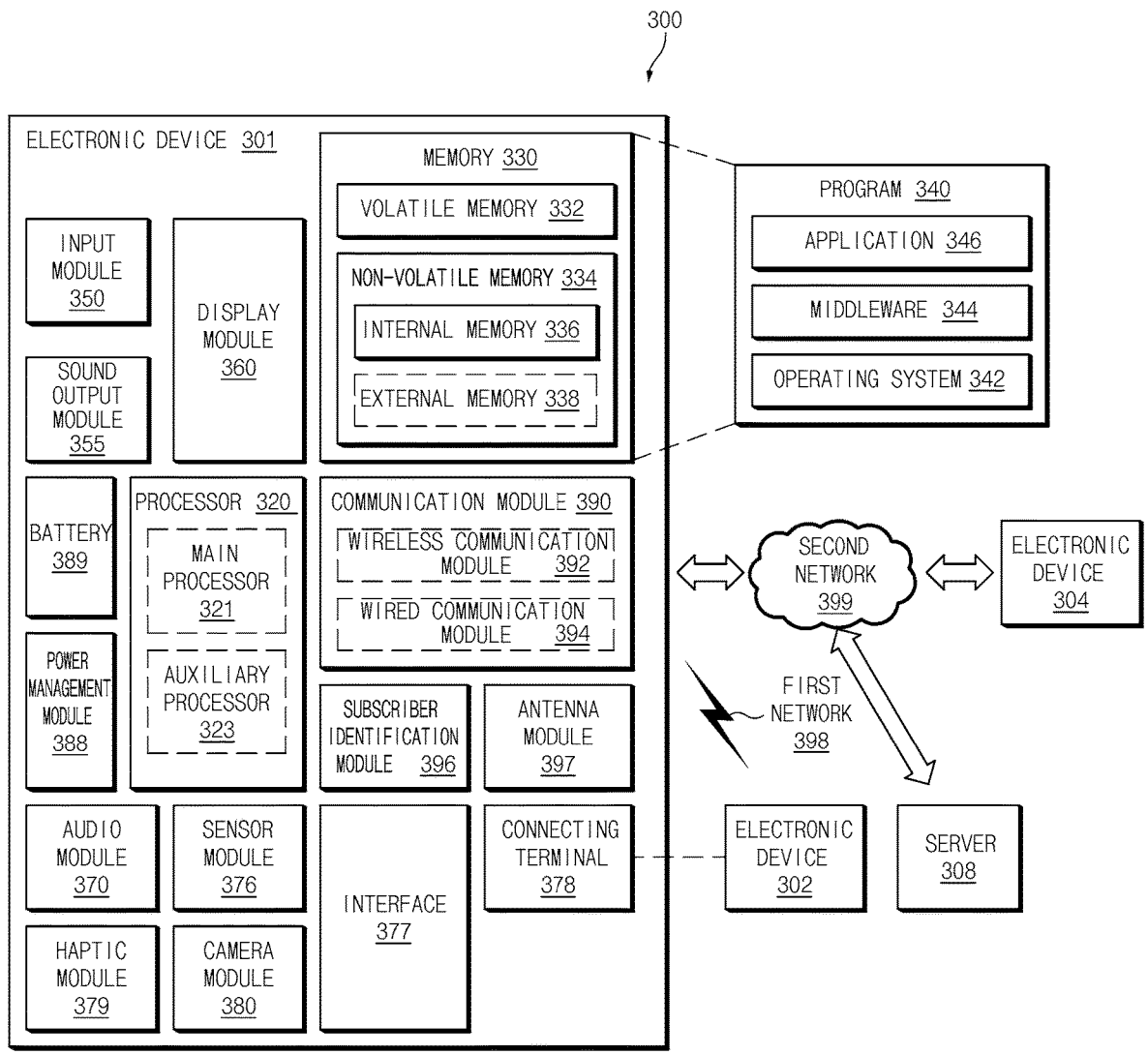
FIG. 12 is a block diagram of an electronic device in a network environment according to an embodiment of the disclosure.

FIG. 12 is a block diagram illustrating an electronic device in a network environment according to an embodiment of the disclosure.

Referring to FIG. 12, the electronic device 301 in the network environment 300 may communicate with an electronic device 302 via a first network 398 (e.g., a short-range wireless communication network), or at least one of an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In some embodiments, at least one of the components (e.g., the connecting terminal 378) may be omitted from the electronic device 301, or one or more other components may be added in the electronic device 301. In some embodiments, some of the components (e.g., the sensor module 376, the camera module 380, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. According to an embodiment, the auxiliary processor 323 (e.g., the neural processing unit) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment, the display module 360 may include a touch sensor adapted to detect a touch, or a pressure sensor adapted to measure the intensity of force incurred by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (MST)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In another embodiment, the external electronic device 304 may include an internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

An electronic device 100 according to an embodiment of the disclosure may include a housing 110 having a key hole 118 formed therein and including a switch 153 disposed therein, the key hole 118 being formed such that a length h1 extending in a first direction D1 is longer than a length h2 extending in a second direction D2 perpendicular to the first direction D1, and a key assembly 200 coupled to the housing 110, at least part of the key assembly 200 being disposed inside the key hole 118. The key assembly 200 may include a cover member 210, at least part of which is exposed outside the housing 110 through the key hole 118 and a pressing member 220 that is coupled to the cover member 210 and that presses the switch 153. The pressing member 220 may include first protrusions 231 protruding from opposite longitudinal end portions of the pressing member 220 in the first direction D1, and the first protrusions 231 may be brought into contact with an inner wall of the key hole 118 in the first direction D1 and may have elasticity such that at least parts of the first protrusions 231 are capable of elastic deformation.

In various embodiments, the key assembly 200 may be movably inserted into the key hole 118, and the first protrusions 231 may be capable of elastic deformation in response to a movement of the key assembly 200 in a state of being brought into close contact with the inner wall of the key hole 118.

In various embodiments, the first protrusions 231 may include first portions 231a extending from the opposite longitudinal end portions of the pressing member 220 in the first direction D1 and second portions 231b extending from the first portions 231a toward the outside of the housing 110.

In various embodiments, the key assembly 200 may be capable of being pressed in a third direction D3 toward the inside of the housing 110 from outside the housing 110, and the third direction D3 may be substantially perpendicular to the first direction D1 and the second direction D2.

In various embodiments, the second portions 231b may extend from the first portions 231a in a fourth direction D4 opposite to the third direction D3.

In various embodiments, the key assembly 200 may be configured to move in the third direction D3 by a first length L1 when an external force is applied in the third direction D3 and to move in a fourth direction D4 opposite to the third direction D3 by the first length L1 when the external force is removed.

In various embodiments, the second portions 231b may protrude from the first portions 231a in the fourth direction D4 by a second length L2, and the second length L2 may be greater than the first length L1.

In various embodiments, the first protrusions 231 may include contact surfaces 236 located on end portions of the first protrusions 231 in the first direction D1 and at least partially brought into contact with the inner wall of the key hole 118, and the contact surfaces 236 may include at least one of a curved surface and an inclined surface.

In various embodiments, partial areas of the second portions 231b disposed to face the inner wall of the key hole 118 may include at least one of a curved surface and an inclined surface, and the partial areas of the second portions 231b may be formed to be inclined toward the first portions 231a along the third direction D3.

In various embodiments, the key assembly 200 may be configured to be coupled to the housing 110 by being inserted into the key hole 118 from outside the housing 110, and an extension direction of the second portions 231b may be substantially opposite to an insertion direction of the key assembly 200.

In various embodiments, the pressing member 220 may further include a second protrusion 237 protruding from a partial area of the pressing member 220 in the second direction D2 and having elasticity, and the second protrusion 237 may prevent separation of the key assembly 200 from the key hole 118 by being stopped by a step 1181 formed inside the housing 110.

In various embodiments, the first protrusions 231 may be spaced apart from opposite longitudinal end portions of the cover member 210 at specified intervals.

In various embodiments, the cover member 210 may include recesses 213 formed on the opposite end portions of the cover member 210 to partially face the first protrusions 231, and the recesses 213 may provide spaces by which the first protrusions 231 and the opposite end portions of the cover member 210 are spaced apart from each other at the specified intervals.

In various embodiments, the pressing member 220 may include a first member 230 coupled to the cover member 210 to face toward the inside of the housing 110 and formed of a material having elasticity and a second member 240 coupled to the first member 230 to face the cover member 210 with the first member 230 therebetween, and the first protrusions 231 may protrude from opposite longitudinal end portions of the first member 230.

In various embodiments, the second member 240 may include a pressing protrusion 241 protruding from one area of the second member 240 toward the switch 153, and the pressing protrusion 241 may be configured to press the switch 153.

In various embodiments, the electronic device 100 may further include a key circuit board 150 that is disposed inside the housing 110 and that has the switch 153 provided on one side thereof and a key bracket 160 on which at least part of the key circuit board 150 is seated and that supports the key circuit board 150 such that the key circuit board 150 is fixed inside the housing 110. The housing 110 may include a bracket recess 119 that is formed adjacent to the key hole 118 and in which at least part of the key circuit board 150 and at least part of the key bracket 160 are accommodated.

An electronic device 100 according to an embodiment of the disclosure may include a housing 110 including a front surface (e.g., first surface 111 and third surface 113), a rear surface (e.g., second surface 112 and fourth surface 114) that faces away from the front surface (e.g., first surface 111 and third surface 113), and a side surface (e.g., side members 115 and 116) that surrounds an inner space between the front surface (e.g., first surface 111 and third surface 113) and the rear surface (e.g., second surface 112 and fourth surface 114), the side surface (e.g., side members 115 and 116) including a key hole 118 formed through the side surface (e.g., side members 115 and 116) in a direction toward the inner space from a partial area of the side surface (e.g., side members 115 and 116), and a side key (e.g., key assembly 200), at least part of which is inserted into the key hole 118, the side key (e.g., key assembly 200) being configured to move in the key hole 118 by a first length L1 by a click operation. The side key (e.g., key assembly 200) may include a cover member 210 exposed on the side surface (e.g., side members 115 and 116) through the key hole 118 and a pressing member 220 that is coupled to the cover member 210 and that presses a dome switch 153 disposed in the inner space. The pressing member 220 may include a first member 230 formed of an elastic material and a second member 240 that is coupled to the first member 230 and that presses the dome switch 153 depending on a movement of the side key (e.g., key assembly 200). The first member 230 may include first protrusions 231 protruding from opposite end portions of the first member 230 in a length direction of the side key (e.g., key assembly 200), and the first protrusions 231 may be brought into contact with an inner wall of the key hole 118 in a length direction of the key hole 118.

In various embodiments, the first protrusions 231 may include first portions extending from the first member 230 in a first direction D1 substantially parallel to the length direction of the side key (e.g., key assembly 200) and second portions 231b extending from the first portions in a direction perpendicular to the first direction D1. The direction in which the second portions 231b extend from the first portions 231a may be opposite to a direction in which the side key (e.g., key assembly 200) is clicked.

In various embodiments, the second portions 231b may protrude from the first portions 231a by a second length L2 in a direction opposite to the direction in which the side key is clicked, and the second length L2 may be greater than the first length L1.

In various embodiments, the second portions 231b may include contact surfaces 236 at least partially brought into contact with the inner wall of the key hole 118, and the contact surfaces 236 may include at least one of a curved surface and an inclined surface.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 100 or 301). For example, a processor (e.g., the processor 320) of the machine (e.g., the electronic device 100 or 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing having a key hole formed therein and comprising a switch disposed therein, the key hole being formed such that a length extending in a first direction is longer than a length extending in a second direction perpendicular to the first direction and a third direction; and
a key assembly coupled to the housing, at least part of the key assembly being disposed inside the key hole,
wherein the key assembly comprises:
a cover member, at least part of which is exposed outside the housing through the key hole, and
a pressing member coupled to the cover member and configured to press the switch,
wherein the pressing member comprises first protrusions protruding from opposite longitudinal end portions of the pressing member in the first direction perpendicular to the second direction and the third direction in which the pressing member presses the switch, wherein the first protrusions have elasticity such that at least parts of the first protrusions are capable of elastic deformation, and wherein the first protrusions comprise contact surfaces being brought into contact with an inner wall of the key hole in the first direction perpendicular to the third direction.

2. The electronic device of claim 1,
wherein the key assembly is movably inserted into the key hole, and
wherein the first protrusions are capable of elastic deformation in response to a movement of the key assembly in a state of being brought into close contact with the inner wall of the key hole.

3. The electronic device of claim 1, wherein the first protrusions comprise:
first portions extending from the opposite longitudinal end portions of the pressing member in the first direction, and
second portions extending from the first portions toward the outside of the housing.

4. The electronic device of claim 3,
wherein the key assembly is capable of being pressed in the third direction toward the inside of the housing from outside the housing.

5. The electronic device of claim 4, wherein the second portions extend from the first portions in a fourth direction opposite to the third direction.

6. The electronic device of claim 4, wherein the key assembly is configured to:
move in the third direction by a first length when an external force is applied in the third direction, and
move in a fourth direction opposite to the third direction by the first length when the external force is removed.

7. The electronic device of claim 6,
wherein the second portions protrude from the first portions in the fourth direction by a second length, and
wherein the second length is greater than the first length.

8. The electronic device of claim 4,
wherein partial areas of the second portions disposed to face the inner wall of the key hole comprise at least one of a curved surface or an inclined surface, and
wherein the partial areas of the second portions are formed to be inclined toward the first portions along the third direction.

9. The electronic device of claim 3,
wherein the key assembly is configured to be coupled to the housing by being inserted into the key hole from outside the housing, and
wherein an extension direction of the second portions is substantially opposite to an insertion direction of the key assembly.

10. The electronic device of claim 1,
wherein the contact surfaces are located on end portions of the first protrusions in the first direction, and
wherein the contact surfaces comprise at least one of a curved surface or an inclined surface.

11. The electronic device of claim 1,
wherein the pressing member further comprises a second protrusion protruding from a partial area of the pressing member in the second direction and having elasticity, and
wherein the second protrusion prevents separation of the key assembly from the key hole by being stopped by a step formed inside the housing.

12. The electronic device of claim 1, wherein the first protrusions are spaced apart from opposite longitudinal end portions of the cover member at specified intervals.

13. The electronic device of claim 12,
wherein the cover member comprises recesses formed on the opposite longitudinal end portions of the cover member to partially face the first protrusions, and
wherein the recesses provide spaces by which the first protrusions and the opposite longitudinal end portions of the cover member are spaced apart from each other at the specified intervals.

14. The electronic device of claim 1,
wherein the pressing member comprises:
a first member coupled to the cover member to face toward the inside of the housing and formed of a material having elasticity, and
a second member coupled to the first member to face the cover member with the first member therebetween, and
wherein the first protrusions extend from opposite longitudinal end portions of the first member.

15. The electronic device of claim 14,
wherein the second member comprises a pressing protrusion protruding from one area of the second member toward the switch, and
wherein the pressing protrusion is configured to press the switch.

16. The electronic device of claim 1, further comprising:
a key circuit board disposed inside the housing, the key circuit board having the switch provided on one side thereof; and
a key bracket on which at least part of the key circuit board is seated, the key bracket being configured to support the key circuit board such that the key circuit board is fixed inside the housing,
wherein the housing comprises a bracket recess in which at least part of the key circuit board and at least part of the key bracket are accommodated, the bracket recess being formed adjacent to the key hole.

17. An electronic device comprising:
a housing comprising a front surface, a rear surface configured to face away from the front surface, and a side surface configured to surround an inner space between the front surface and the rear surface,
wherein the side surface comprises a key hole formed through the side surface in a direction toward the inner space from a partial area of the side surface; and
a side key, at least part of which is inserted into the key hole, the side key being configured to move in the key hole by a first length by a click operation,
wherein the side key comprises a cover member exposed on the side surface through the key hole and a pressing member coupled to the cover member and configured to press a dome switch disposed in the inner space,
wherein the pressing member comprises a first member formed of an elastic material and a second member coupled to the first member and configured to press the dome switch depending on a movement of the side key,
wherein the first member comprises first protrusions protruding from opposite end portions of the first member in a length direction of the side key perpendicular to a width direction of the side key, and
wherein the first protrusions comprise contact surfaces being brought into contact with an inner wall of the key hole in the length direction perpendicular to a direction in which the side key is clicked.

18. The electronic device of claim 17, wherein the first protrusions comprise:

first portions extending from the first member in the length direction of the side key, and second portions extending from the first portions in a direction perpendicular to the length direction and including the contact surfaces, and wherein the direction in which the second portions extend from the first portions is opposite to a direction in which the side key is clicked.

19. The electronic device of claim 18, wherein the second portions protrude from the first portions by a second length in a direction opposite to the direction in which the side key is clicked, and wherein the second length is greater than the first length.

20. The electronic device of claim 18, wherein the contact surfaces comprise at least one of a curved surface or an inclined surface.

* * * * *